US010357782B2

United States Patent
Rothman et al.

(10) Patent No.: US 10,357,782 B2
(45) Date of Patent: *Jul. 23, 2019

(54) FLOTATION SEPARATION USING LIGHTWEIGHT SYNTHETIC BEADS OR BUBBLES

(75) Inventors: Paul J. Rothman, Windsor, CT (US); Mark R. Fernald, Enfield, CT (US); Francis K. Didden, Wallingford, CT (US); Christian V. O'Keefe, Durham, CT (US); Alan D. Kersey, Glastonbury, CT (US); Douglas H. Adamson, Mansfield Center, CT (US)

(73) Assignee: CiDRA Corporate Services LLC, Wallingford, CT (US)

( * ) Notice: Subject to any disclaimer, the term of this patent is extended or adjusted under 35 U.S.C. 154(b) by 1464 days.

This patent is subject to a terminal disclaimer.

(21) Appl. No.: 14/116,438

(22) PCT Filed: May 25, 2012

(86) PCT No.: PCT/US2012/039528
§ 371 (c)(1),
(2), (4) Date: Feb. 3, 2014

(87) PCT Pub. No.: WO2012/166580
PCT Pub. Date: Dec. 6, 2012

(65) Prior Publication Data
US 2014/0166585 A1      Jun. 19, 2014

Related U.S. Application Data

(60) Provisional application No. 61/489,893, filed on May 25, 2011, provisional application No. 61/533,544, filed on Sep. 12, 2011.

(51) Int. Cl.
*B03D 1/14*    (2006.01)
*B03C 5/00*    (2006.01)
(Continued)

(52) U.S. Cl.
CPC ............... *B03C 5/00* (2013.01); *B01D 15/02* (2013.01); *B01D 37/02* (2013.01); *B01D 39/00* (2013.01);
(Continued)

(58) Field of Classification Search
None
See application file for complete search history.

(56) References Cited

U.S. PATENT DOCUMENTS

| 1,684,536 A | 9/1928 | Fischer |
| 2,585,473 A | 2/1952 | Kennedy |

(Continued)

FOREIGN PATENT DOCUMENTS

| CN | 1011778957 | 7/2010 |
| CN | 101970119 | 2/2011 |

(Continued)

OTHER PUBLICATIONS

Wyss et al. "A novel approach for the extraction of herbicides and pesicides from water using liquid-core microcapsules" by Wyss et al. Biotechnology and Engineering; Aug. 19, 2004; abstract, 3 pages.

(Continued)

*Primary Examiner* — Thomas M Lithgow
(74) *Attorney, Agent, or Firm* — Ware, Fressola, Maguire & Barber LLP

(57) ABSTRACT

Apparatus, such as a flotation separation device, features a flotation cell or column configured to receive a mixture of water, valuable material and unwanted material; receive polymer-based materials, including polymer bubbles or beads, configured to attach to the valuable material in the mixture; and provide enriched polymer-based materials, including enriched polymer bubbles or beads, having the valuable material attached thereon.

54 Claims, 7 Drawing Sheets

(51) Int. Cl.

| | | |
|---|---|---|
| *B04C 1/00* | (2006.01) | |
| *B07B 1/00* | (2006.01) | |
| *B03B 1/04* | (2006.01) | |
| *B03D 1/02* | (2006.01) | |
| *B01D 37/02* | (2006.01) | |
| *C02F 1/24* | (2006.01) | |
| *B01D 39/00* | (2006.01) | |
| *C22B 15/00* | (2006.01) | |
| *B01D 15/02* | (2006.01) | |
| *B03D 1/016* | (2006.01) | |
| *B03C 1/01* | (2006.01) | |
| *B03C 5/02* | (2006.01) | |

(52) U.S. Cl.
CPC ............... *B03B 1/04* (2013.01); *B03C 1/01* (2013.01); *B03C 5/02* (2013.01); *B03D 1/016* (2013.01); *B03D 1/023* (2013.01); *B03D 1/14* (2013.01); *B04C 1/00* (2013.01); *B07B 1/00* (2013.01); *C02F 1/24* (2013.01); *C22B 15/0063* (2013.01); *Y10T 428/2982* (2015.01)

(56) References Cited

U.S. PATENT DOCUMENTS

| | | | |
|---|---|---|---|
| 2,588,976 A | 3/1952 | Fuhrmeister, Jr. | |
| 2,678,132 A | 5/1954 | Beard, Jr. | |
| 2,699,872 A | 1/1955 | Kelsey | |
| 3,224,582 A | 12/1965 | Iannicelli | |
| 3,796,308 A | 3/1974 | McIlhinney et al. | |
| 3,868,318 A | 2/1975 | Clark et al. | |
| 3,970,518 A | 7/1976 | Giaever | |
| 4,100,242 A | 7/1978 | Leach | |
| 4,177,253 A | 12/1979 | Davies et al. | |
| RE30,360 E | 8/1980 | Shubert | |
| 4,224,138 A | 9/1980 | Kruyer | |
| 4,235,562 A | 11/1980 | Ribas | |
| 4,236,995 A | 12/1980 | Kruyer | |
| 4,269,699 A | 5/1981 | McCready et al. | |
| 4,313,832 A | 2/1982 | Shimizu et al. | |
| 4,358,368 A | 11/1982 | Hellsten et al. | |
| 4,363,749 A | 12/1982 | Weiss et al. | |
| 4,391,608 A | 7/1983 | Dondelewski | |
| 4,412,843 A | 11/1983 | Burgess et al. | |
| 4,511,461 A | 4/1985 | Kruyer | |
| 4,532,032 A | 7/1985 | Ng et al. | |
| 4,537,599 A | 8/1985 | Greenwald, Sr. | |
| 4,556,482 A | 12/1985 | Nagaraj | |
| 4,657,666 A | 4/1987 | Snook et al. | |
| 4,685,963 A | 8/1987 | Saville | |
| 4,888,106 A | 12/1989 | Lipp et al. | |
| 4,956,077 A | 9/1990 | Barwise | |
| 4,971,685 A | 11/1990 | Stanley et al. | |
| 4,981,582 A | 1/1991 | Yoon et al. | |
| 5,161,694 A | 11/1992 | Yoon et al. | |
| 5,167,798 A * | 12/1992 | Yoon ............... | B01F 3/04113 209/10 |
| 5,192,423 A | 3/1993 | Duczmal et al. | |
| 5,256,298 A | 10/1993 | Powell | |
| 5,603,841 A | 2/1997 | Kerr | |
| 5,670,056 A | 9/1997 | Yoon et al. | |
| 5,746,910 A * | 5/1998 | Negeri ............... | B03D 1/24 209/168 |
| 5,965,117 A | 10/1999 | Howard, Jr. et al. | |
| 6,234,318 B1 | 5/2001 | Breau et al. | |
| 6,312,603 B1 | 11/2001 | Nishizawa | |
| 6,319,407 B1 | 11/2001 | Maatta et al. | |
| 6,799,682 B1 | 10/2004 | Yoon | |
| 6,871,743 B2 | 3/2005 | Yoon | |
| 6,890,431 B1 | 5/2005 | Eades et al. | |
| 7,264,728 B2 | 9/2007 | Gibson et al. | |
| 7,285,219 B2 | 10/2007 | Kolesinski | |
| 7,426,852 B1 * | 9/2008 | Rothman ............... | G01N 29/024 702/54 |
| 7,488,418 B2 | 2/2009 | Miller | |
| 7,641,863 B2 | 1/2010 | Doktycz et al. | |
| 7,686,960 B2 * | 3/2010 | Cort ............... | B03C 1/015 210/631 |
| 7,759,123 B2 | 7/2010 | Call | |
| 7,891,213 B2 | 2/2011 | Bogdahn et al. | |
| 8,007,754 B2 | 8/2011 | Yoon et al. | |
| 8,408,395 B2 | 4/2013 | Domke | |
| 9,302,270 B2 | 4/2016 | Rothman | |
| 9,566,613 B2 | 2/2017 | Kodama et al. | |
| 9,981,272 B2 * | 5/2018 | Rothman ............... | B03B 1/04 |
| 2001/0008617 A1 | 7/2001 | Robles | |
| 2003/0104359 A1 | 6/2003 | Cuthbertson et al. | |
| 2003/0225231 A1 | 12/2003 | Hall | |
| 2004/0000523 A1 | 1/2004 | Rosenberg et al. | |
| 2004/0173506 A1 | 9/2004 | Doktycz et al. | |
| 2005/0029195 A1 | 2/2005 | Gibson et al. | |
| 2005/0029204 A1 | 2/2005 | Schwartzkopf | |
| 2005/0051465 A1 | 3/2005 | Khan et al. | |
| 2005/0139551 A1 | 6/2005 | Yoon | |
| 2005/0155415 A1 | 7/2005 | Kurkowski et al. | |
| 2005/0242000 A1 | 11/2005 | Khan et al. | |
| 2006/0113259 A1 | 6/2006 | Brunone | |
| 2006/0151397 A1 | 7/2006 | Wright et al. | |
| 2006/0226051 A1 | 10/2006 | Navarrette et al. | |
| 2006/0263516 A1 | 11/2006 | Jones et al. | |
| 2006/0283516 A1 | 12/2006 | Nagaoka et al. | |
| 2008/0139399 A1 | 6/2008 | Fonnum et al. | |
| 2008/0156702 A1 | 7/2008 | Duyvesteyn | |
| 2008/0290029 A1 | 11/2008 | Croue et al. | |
| 2009/0061226 A1 | 3/2009 | Banin et al. | |
| 2009/0139906 A1 | 6/2009 | Kruyer | |
| 2009/0173668 A1 | 7/2009 | Duyvesteyn et al. | |
| 2009/0206040 A1 | 8/2009 | Berg et al. | |
| 2009/0267275 A1 | 10/2009 | Birken | |
| 2009/0301972 A1 | 12/2009 | Hines et al. | |
| 2010/0059449 A1 | 3/2010 | Grass et al. | |
| 2010/0072110 A1 | 3/2010 | Gradek | |
| 2010/0108573 A1 | 5/2010 | Ravishankar et al. | |
| 2010/0200510 A1 | 8/2010 | Domke et al. | |
| 2010/0228056 A1 | 9/2010 | Wang et al. | |
| 2010/0279322 A1 | 11/2010 | Tang et al. | |
| 2010/0285606 A1 | 11/2010 | Phillips et al. | |
| 2010/0294725 A1 | 11/2010 | Bush et al. | |
| 2010/0300941 A1 | 12/2010 | Domke et al. | |
| 2011/0114566 A1 | 5/2011 | McCaw et al. | |
| 2011/0120919 A1 | 5/2011 | Domke et al. | |
| 2011/0120954 A1 | 5/2011 | Domke | |
| 2011/0131873 A1 | 6/2011 | Soane et al. | |
| 2011/0174696 A1 | 7/2011 | Young | |
| 2012/0029120 A1 | 2/2012 | Soane et al. | |
| 2012/0076694 A1 | 3/2012 | Morozov et al. | |
| 2012/0091000 A1 | 4/2012 | Taylor et al. | |
| 2013/0140218 A1 | 6/2013 | Dobby | |

FOREIGN PATENT DOCUMENTS

| | | |
|---|---|---|
| EP | 0164237 | 12/1980 |
| EP | 0163480 A1 | 12/1985 |
| EP | 0348620 | 1/1990 |
| EP | 1184064 | 3/2002 |
| EP | 2313200 | 4/2011 |
| GB | 1339337 | 12/1973 |
| KZ | 22494 | 5/2010 |
| RU | 2038155 | 6/1995 |
| RU | 2063813 | 7/1996 |
| RU | 2091141 | 9/1997 |
| SU | 118472 | 1/1959 |
| SU | 441314 | 8/1974 |
| SU | 1558473 | 4/1990 |
| WO | 8301397 | 4/1983 |
| WO | 8404701 | 12/1984 |
| WO | WO 89/10202 | * 11/1989 |
| WO | 9211091 | 7/1992 |
| WO | 02066168 | 8/2002 |
| WO | 2004064997 | 8/2004 |
| WO | 2005066631 | 7/2005 |
| WO | 2007098115 | 8/2007 |
| WO | 2008055371 | 5/2008 |

(56) References Cited

FOREIGN PATENT DOCUMENTS

| WO | 20090252362 | 4/2009 |
|----|-------------|--------|
| WO | 2010007157 | 1/2010 |
| WO | 2010098786 A1 | 9/2010 |
| WO | 2011091522 | 8/2011 |

OTHER PUBLICATIONS

Krishna et al. "Synthesis of xanthate functionalized silica gel and its application for the preconcentration and separation of uranium (VI) from inorganic components." Journal of Radioanalytical and Nuclear Chemistry. vol. 266, No. 2 (2005) 251-257.
Brown et al. Magnetic Control over Liquid Surface Properties with Responsive Surfactants. Angew. Chem. Int. Ed. 51: 1-4, 2012 (retrieved on Apr. 6, 2013). Retrieved from the Internet. <URL: http://www.magneticmicrosphere.com/ckfinder/userfiles/files/Brown_magnetic_detergent_2012.pdf>. entire document.
"The process of separation of fine mineral particles by flotation with hydrophobic polymeric carrier" by Jorge Rubio et al, International Journal of Mineral Processing, vol. 37, No. 1-2, Jan. 1, 1993, pp. 109-122.
CN 101778957 English Language Abstract (1 page).
English Language Abstract of EP2313200 not available. EP2313200 also published as WO2010007157A1—Abstract of which is attached here.
RU2091141 English Language Abstract (1 page).
SU441314 English Language translation (4 pages).
KZ22494 English Language Abstract (1 page). There are two Patentees of KZ22494—«(73) Товарищество с ограниченной ответственностью " Горнорудная компания "; Товарищество с ограниченной ответственностью 'Институт высоких технологий ». The Patentees are translated as: (73) limited liability company «Ore mining company»; limited liability company «Institute of high technology».
English Language Abstract of CN101970119 (1 page).
English language Abstract of SU118472 (2 pages).
English Language Abstract of RU2063813.
English Language Abstract of RU2038155.
English Language Abstract of SU1558473.
Nimittrakoolchai et al., Deposition of transparent, hydrophobic polydimethylsiloxane-nanocrystalline TiO2 hybrid films on glass substrate, Sep. 28, 2007, Songklanakarin, pp. 1, 2 and 6.
Please see excerpt from p. 2/15 of a 4th Office Action issued by the State Intellectual Property Office dated Jul. 21, 2016 showing relevance of p. 338 of Application of Polymer in Concrete, Aug. 31, 2003.
Application of polymer in concrete, Shiyun Zhong, et al., Chemical industry press, published on Aug. 31, 2003, p. 338.
Decision on Granting issued by the Russian Patent Office in counterpart Russian application 2013157534 dated Feb. 24, 2016 (8 pages).

* cited by examiner

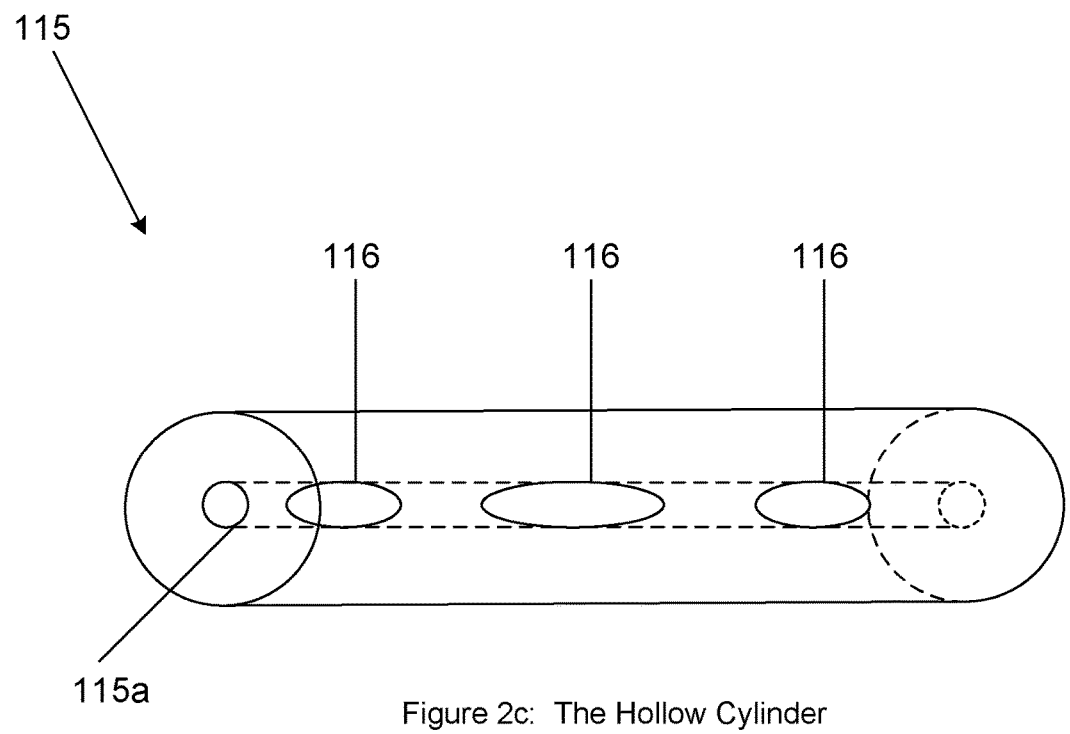
Figure 2c: The Hollow Cylinder
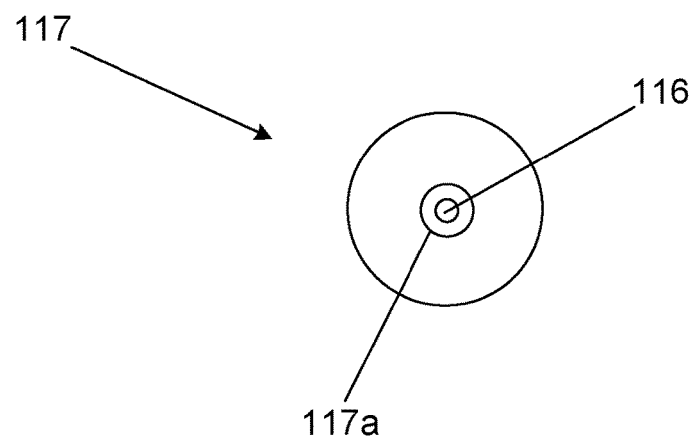
Figure 2d: The Hollow Sphere

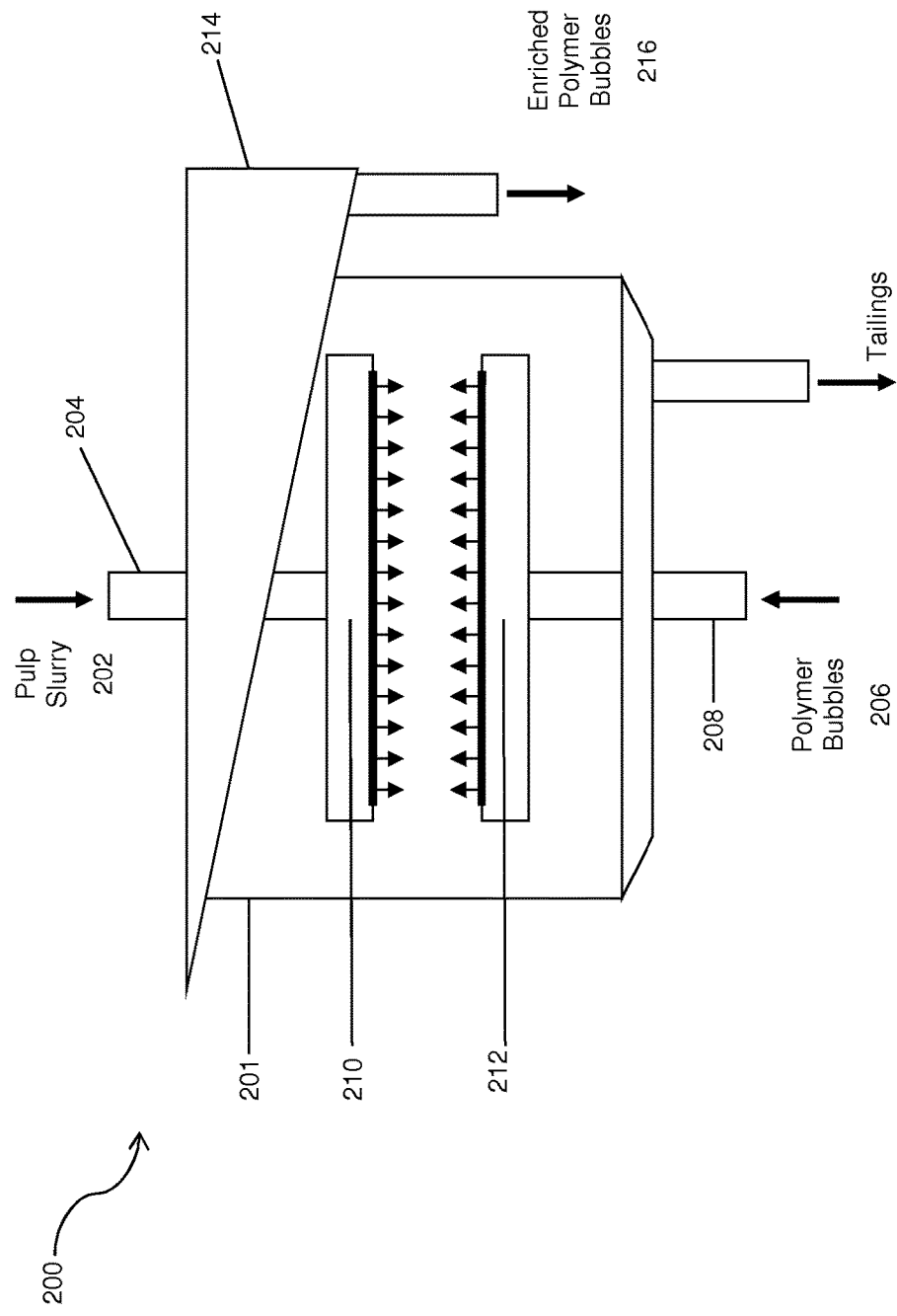

FLOTATION SEPARATION USING LIGHTWEIGHT SYNTHETIC BEADS OR BUBBLES

CROSS-REFERENCE TO RELATED APPLICATIONS

The present application corresponds to international patent application serial no. PCT/US2012/039528, filed 25 May 2012, claims the benefit of U.S. Provisional Patent Application No. 61/489,893, filed 25 May 2011, and U.S. Provisional Patent Application No. 61/533,544, filed 12 Sep. 2011, which are both incorporated by reference in their entirety.

This application is also related to the following eight PCT applications, which are all concurrently filed on 25 May 2012, which all claim the benefit of the aforementioned U.S. Provisional Patent Application No. 61/489,893, filed 25 May 2011, and the aforementioned U.S. Provisional Patent Application No. 61/533,544, filed 12 Sep. 2011, and which are all incorporated by reference in their entirety so as to include the subject matter of each other, as follows:

- PCT application no. PCT/US12/39534, entitled "Mineral separation using functionalized membranes;"
- PCT application no. PCT/US12/39540, entitled "Mineral separation using sized, weighted and magnetized beads;"
- PCT application no. PCT/US12/39576, entitled "Synthetic bubbles/beads functionalized with molecules for attracting or attaching to mineral particles of interest;"
- PCT application no. PCT/US12/39591, entitled "Method and system for releasing mineral from synthetic bubbles and beads;"
- PCT application no. PCT/US/39596, entitled "Synthetic bubbles and beads having hydrophobic surface;"
- PCT application no. PCT/US/39631, entitled "Mineral separation using functionalized filters and membranes;"
- PCT application no. PCT/US12/39655, entitled "Mineral recovery in tailings using functionalized polymers;" and
- PCT application no. PCT/US12/39658, entitled "Techniques for transporting synthetic beads or bubbles In a flotation cell or column."

BACKGROUND OF THE INVENTION

1. Technical Field

This invention relates generally to a method and apparatus for separating valuable material from unwanted material in a mixture, such as a pulp slurry.

2. Description of Related Art

In many industrial processes, flotation is used to separate valuable or desired material from unwanted material. By way of example, in this process a mixture of water, valuable material, unwanted material, chemicals and air is placed into a flotation cell. The chemicals are used to make the desired material hydrophobic and the air is used to carry the material to the surface of the flotation cell. When the hydrophobic material and the air bubbles collide they become attached to each other. The bubble rises to the surface carrying the desired material with it.

The performance of the flotation cell is dependent on the bubble surface area flux in the collection zone of the cell. The bubble surface area flux is dependent on the size of the bubbles and the air injection rate. Controlling the bubble surface area flux has traditionally been very difficult. This is a multivariable control problem and there are no dependable real time feedback mechanisms to use for control.

The mineral recovery of such a process can be highly dependent on the mineral particle size distribution entering the flotation cell. Typically, coarse and fine particles recovery can be significantly less than the optimal particle size. Mining operations routinely discharge large well liberated particles to the tailings pond.

There is a need in the industry to provide a better way to separate valuable material from unwanted material, e.g., including in such a flotation cell, so as to eliminate problems associated with using air bubbles in such a separation process.

SUMMARY OF THE INVENTION

The present invention provides flotation separation techniques using lightweight synthetic beads or bubbles, or so-called "Engineered Bubbles."™

The present invention consists of replacing the air bubbles in a flotation cell that are presently used in the prior art with a similar density material that has very controllable size characteristics. By controlling the size and the injection rate a very accurate surface area flux can be achieved. This type of control would enable the bead or bubble size to be tuned or selected to the particle size of interest in order to better separate valuable or desired material from unwanted material in the mixture. By way of example, the material or medium could be a polymer or polymer-based bubble or bead. These polymer or polymer-based bubbles or beads are very inexpensive to manufacture and have a very low density. They behave very similar to a bubble, but do not pop.

Since this lifting medium size is not dependent on the chemicals in the flotation cell, the chemicals may be tailored to optimize hydrophobicity and froth stability. There is no need to compromise the performance of the frother in order to generate the desired bubble size. A controlled size distribution of medium may be customized to maximize recovery of different feed matrixes to flotation as ore quality changes.

There may be a mixture of both air and lightweight beads or bubbles. The lightweight beads or bubbles may be used to lift the valuable material and the air may be used to create the desired froth layer in order to achieve the desired material grade.

Bead or bubble chemistry is also developed to maximize the attachment forces of the lightweight beads or bubbles and the valuable material.

A bead recovery process is also be developed to enable the reuse of the lightweight beads or bubbles in a closed loop process. This process may consist of a washing station whereby the valuable mineral is mechanically, chemically, or electro-statically removed from the lightweight beads or bubbles.

The Separation Process or Processor

According to some embodiments of the present invention, and by way of example, the separation process may utilize exiting mining industry equipment, including traditional column cells and thickeners. The lightweight synthetic beads or bubbles, including polymer bubbles, may be injected into a first traditional column or cell at an injection air port and rise to the surface. This first traditional column or cell has an environment that is conducive to particle attachment. As the lightweight synthetic beads or bubbles rise they collide with the falling mineral particles. The falling mineral particles stick to the lightweight synthetic beads or bubbles and float or report to the surface. The wash water can be used to clean off the entrained gangue. The recovered bubbles and mineral may be sent to another traditional column or cell and injected into, e.g., the middle of the column. This traditional column or cell has an environment that will promote release of the mineral particles. The mineral particles fall to the bottom and the synthetic bubbles or beads float or go to the surface. The synthetic bubbles or beads may be reclaimed and then sent back through the process taking place in the first traditional column or cell. Thickeners may be used to reclaim the process water at both stages of the process.

Flotation Recovery of Course Ore Particles in Mining

According to some embodiments, the present invention may be used for flotation recovery of coarse ore particles in mining.

For example, the concept may take the form of the creation of the lightweight synthetic beads or bubbles in a flotation recovery for lifting particles, e.g., greater than 150 micron, to the surface in a flotation cell or column.

The fundamental notion is to create a shell or "semi-porous" structured bead or bubble of a predetermined size and use this as an 'engineered 'air bubble' for improving flotation recovery, e.g., of coarse ore particles in mining.

Flotation recovery may be implemented in multiple stages, e.g., where the first stage works well at recovering the ground ore at the right size (<150 microns), but ore particles that are too small or to large pass on to later stages and are more difficult to recover.

The present invention includes creating the "bubbles," and engineering them to carry the ore to the surface using, e.g., a polymer shell or structure, appropriately chemically activated to attract the ore.

Depending on the method of "engineering" the bubble, at or near the surface the shell could dissolve (time activated), and release an agent that further promotes the frothing.

Polymer Blocks Having Incorporated Air

According to some embodiments, the present invention may take the form of synthetic flotation bubbles, using a concept such as to incorporate air bubbles into polymer blocks, which are designed to attract mineral rich ore onto their surface and then float to the top of the flotation tank.

The benefits of this approach include the fact that "engineered bubbles" in a polymer may enable a much larger range of ore grains to be lifted to the surface hence improving recover efficiency.

According to some embodiments, optimally sized polymer blocks with a high percentage of air may be produced with appropriate collector chemicals also encapsulated into the polymer.

Once the blocks are in, e.g., a mixture such as a slurry pulp, the collector chemicals may be released to initially attract mineral rich ore particles and then rise to the surface.

Super Wetability Concept

According to some embodiments, the present invention may be implemented using a super wetability concept, by using tailored collector molecules to improve wetability of ore rich particles, e.g., to improve the take up of ore rich particles of varying sizes in the froth, which is likely to work well for smaller particles. Polymer material with functional groups may be used that bind well to the mineral rich particles with low polar functionality. In addition, linear oligomer/low molecular weight polymer may be used to wrap around ore rich particles making them more hydrophobic and hence more likely to float when foamed. Some advantages of the super wetability concept include increasing the surface area of the synthetic bead or bubble, as well as increasing the amount of surface area in contact with the ore rich particle. The scope of the invention is also intended to include using a super hydrophobic polymer that coats the surface, or using a specific coating that is selected to attract a particular mineral of interest in the mixture.

Dosage Control

According to some embodiments, the present invention may be implemented so that the synthetic beads or bubbles may be functionalized in order to control the chemistry of a process being performed in a cell or column, including to release a chemical to control the chemistry of a flotation separation process. For example, chemicals used in the flotation separation of mining ores can be encapsulated into polymer or polymer-based beads or bubbles to provide a slow or targeted release of the chemical once released into the water tank. The chemical would be contained within a safe polymer during transportation and delivery of the chemical to the flotation tank. The benefits of this approach include the following: more efficient use of chemical treatment reduces chemical cost; associated transportation costs of chemical may be lowered; and the reactive chemical is encapsulated, allowing safer delivery of chemical by user.

According to some embodiments, the required chemical would be encapsulated into a polymer block that could be tailored to suit the release rate and potentially the location in the flotation tank where the release is required, including using synthetic beads or bubbles configured to burst at a certain pressure, or using synthetic beads or bubbles configured to burst when the mineral of interest is contacted, or using synthetic beads or bubbles configured to release a chemical when contacting air, e.g., in the froth.

According to some embodiments, the present invention provides the potential to encapsulate a wide variety of chemical and for chemical mixes including typical frothers, collectors and other additives commonly used in a flotation separation process.

The synthetic beads or bubbles according to some embodiments of the present invention provide an easy way to deliver chemistry to a process being performed in standard equipment already being used in the industry without drilling new holes or adapting new pumps or valves, etc. to the standard equipment.

The synthetic beads or bubbles according to some embodiments of the present invention may be used to implement and optimize downstream frother injections in a bank of flotation cells or columns, e.g. using time released chemicals.

EXAMPLE OF EMBODIMENTS

Apparatus in the Form of a Cell or Column

According to some embodiments, the present invention may take the form of apparatus featuring a cell or column configured to receive a mixture of fluid (e.g. water) and valuable material and unwanted material; receive synthetic bubbles or beads constructed to be buoyant when submerged in the mixture and functionalized to control the chemistry of a process being performed in the cell or column; and provide enriched synthetic bubbles or beads having the valuable material attached thereto.

According to some embodiments of the present invention, the synthetic bubbles or beads may be made from a polymer or polymer-based material, or silica or silica-based material, or glass or glass-based material.

According to some embodiments of the present invention, the cell or column may take the form of a flotation cell or column, and the synthetic bubbles or beads may be functionalized to attach to the valuable material in the mixture that forms part of a flotation separation process being performed in the flotation cell or column.

According to some embodiments of the present invention, the synthetic bubbles or beads may be functionalized to release a chemical to control the chemistry of the flotation separation process.

According to some embodiments of the present invention, the synthetic bubbles or beads may be configured with firm outer shells functionalized with a chemical to attach to the valuable material in the mixture. Alternatively, the synthetic bubbles or beads may include a chemical that may be released to attach to the valuable material in the mixture.

According to some embodiments of the present invention, the synthetic bubbles or beads may be constructed with firm outer shells configured to contain a gas, including air, so as to increase be buoyant when submerged in the mixture. Alternatively, the synthetic bubbles or beads may be made from a low-density material so as to be buoyant when submerged in the mixture, including the synthetic bubbles being configured as a solid without an internal cavity.

According to some embodiments of the present invention, the synthetic bubbles or beads may include a multiplicity of hollow objects, bodies, elements or structures, each configured with a respective cavity, unfilled space, or hole to trap and maintain a bubble inside. The hollow objects, bodies, elements or structures may include hollow cylinders, or spheres, or globules, or capillary tubes, or some combination thereof. Each hollow object, body, element or structure may be configured with a dimension so as not to absorb liquid, including water, including where the dimension is in a range of about 20-30 microns. The multiplicity of hollow objects, bodies, elements or structures may be configured with chemicals applied to prevent migration of liquid into respective cavities, including where the chemicals are hydrophobic chemicals. The synthetic bubbles or beads made from the silica or silica-based material, or glass or glass-based material, may take the form of hollow glass cylinders manufactured using a drawing and dicing process.

The scope of the invention is not intended to be limited to the size or shape of the synthetic beads or bubbles, so as to enhance their rise or fall in the mixture.

The scope of the invention is also intended to include other types or kinds of ways to construct and functionalize the synthetic bubbles or beads either now known or later developed in the future in order to perform the aforementioned functionality of being buoyant when submerged in the mixture and to attach to the valuable material in the mixture.

According to some embodiments of the present invention, the mixture may take the form of a slurry pulp containing, e.g., water and the valuable material of interest.

A Method for Implementing in a Flotation Separation Device

The present invention may also take the form of a method, e.g., for implementing in a flotation separation device having a flotation cell or column. The method may include steps for receiving in the flotation cell or column a mixture of fluid and valuable material; receiving in the flotation cell or column synthetic bubbles or beads constructed to be buoyant when submerged in the mixture and functionalized to attach to the valuable material in the mixture and; and providing from the flotation cell or column enriched synthetic bubbles or beads having the valuable material attached thereto.

According to some embodiments of the present invention, the method may include being implemented consistent with one or more of the features set forth herein.

Apparatus in the Form of a Flotation Separation Device

According to some embodiments, the present invention may take the form of apparatus such as a flotation separation device, including a flotation cell or column configured to receive a mixture of water, valuable material and unwanted material; receive polymer or polymer-based materials, including polymer or polymer bubbles or beads, configured to attach to the valuable material in the mixture; and provide enriched polymer or polymer-based materials, including enriched polymer or polymer-based bubbles or beads, having the valuable material attached thereon. According to some embodiments, the polymer or polymer-based material may be configured with a surface area flux by controlling some combination of the size of the polymer or polymer-based material and/or the injection rate that the mixture is received in the flotation cell or column; or the polymer or polymer-based material may be configured with a low density so as to behave like air bubbles; or the polymer or polymer-based material may be configured with a controlled size distribution of medium that may be customized to maximize recovery of different feed matrixes to flotation as valuable material quality changes, including as ore quality changes; or some combination thereof.

Apparatus in the Form of a Synthetic Bubbles or Beads

According to some embodiments, the present invention may take the form of apparatus such as synthetic bubbles or beads configured with a polymer or polymer-based material functionalized to attach to a valuable material in a mixture so as to form an enriched synthetic bubbles or beads having the valuable material attracted thereto, and also configured to separate from the mixture based at least partly on a difference in a physical property between the enriched synthetic bubbles or beads having the valuable material attracted thereto and the mixture.

The synthetic bubbles or beads may be configured so that the separation is based at least partly on the difference between the density of the enriched synthetic bubbles or beads having the valuable material attracted thereto and the density of the mixture.

The synthetic bubbles or beads may also be configured so that the separation is based on other differences in the physical property between the enriched synthetic bubbles or beads having the valuable material attracted thereto and the mixture, including between the size of the enriched synthetic bubbles or beads having the valuable material attracted thereto and the size of unwanted material in the mixture; or between the weight of the enriched synthetic bubbles or beads having the valuable material attracted thereto and the weight of unwanted material in the mixture; or between the magnetism of the enriched synthetic bubbles or beads having the valuable material attracted thereto and the magnetism of unwanted material in the mixture, consistent with that disclosed in patent application serial no. PCT/US12/39540, filed May 25, 2012, which is hereby incorporated by reference its entirety.

The Synthetic Beads or Bubbles Chemistry

According to some embodiments of the present invention, the synthetic bead or bubble may take the form of a solid-phase body comprising a surface in combination with a plurality of molecules attached to the surface, the molecules comprising a functional group selected for attracting one or more mineral particles of interest to the molecules.

According to some embodiments of the present invention, the solid-phase body may be made of a synthetic material comprising the molecules. By way of example, the synthetic material may be selected from a group consisting of polyamides (nylon), polyesters, polyurethanes, phenol-formaldehyde, urea-formaldehyde, melamine-formaldehyde, polyacetal, polyethylene, polyisobutylene, polyacrylonitrile, poly(vinyl chloride), polystyrene, poly(methyl methacrylates), poly(vinyl acetate), poly(vinylidene chloride), polyisoprene, polybutadiene, polyacrylates, poly(carbonate), phenolic resin and polydimethylsiloxane.

According to some embodiments of the present invention, the solid-phase body may include a shell providing the surface, the shell being made of a synthetic material comprising the molecules.

According to some embodiments of the present invention, the shell may comprise an interior part arranged to encapsulate a gaseous element such that the synthetic bead has a density less than the aqueous mixture.

According to some embodiments of the present invention, the shell may comprise an interior part arranged to encapsulate a liquid having a chemical property different from the aqueous mixture, in order to control the chemistry of a process being performed in relation to the aqueous mixture.

According to some embodiments of the present invention, the shell may comprise an interior part arranged to encapsulate a solid-phase material different from the synthetic material, and the solid-phase material may be selected to control the density of the synthetic bead relative to the density of the aqueous mixture.

According to some embodiments of the present invention, the shell may comprise an interior part configured to encapsulate a magnetic material.

According to some embodiments of the present invention, the solid-phase body may comprise a core and a coating over the core for providing the surface, and the coating may be made of a synthetic material and the core is made of a core material different from the synthetic material. By way of example, the core material may be selected from a group consisting of glass, ceramic, metal and a polymer that is different from the synthetic material. The term "polymer" in this specification is understood to mean a large molecule made of many units of the same or similar structure linked together.

According to some embodiments of the present invention, the functional group may have an anionic bond for attracting the mineral particles to the surface.

According to some embodiments of the present invention, the functional group may take the form of a collector having a non-ionizing bond or an ionizing bond.

According to some embodiments of the present invention, the ionizing bond may be an anionic bond or a cationic bond.

The anionic bond comprises an oxyhydryl, including carboxylic, sulfates and sulfonates, and sulfhydral bond.

According to some embodiments of the present invention, the synthetic beads may be configured with a size depending on the particular application, or depending on the particular size of the mineral particle of interest. According to some embodiments of the present invention, the synthetic beads may be configured with a size less than 100 µm for attracting to the mineral particles, e.g., having a substantially similar size, including in applications related to flotation cells. Alternatively, according to some embodiments of the present invention, the synthetic beads may be configured with a size in a range of about 1 mm to 10 mm for attracting to the mineral particles, including in applications related to a tailings pond. Furthermore, according to some embodiments of the present invention, the synthetic beads may also be configured with a size of about 100 µm for attracting to the mineral particles, e.g., having a substantially similar size; or the synthetic beads may be configured with a size in a range of about 100-200 µm for attracting to the mineral particles, e.g., having a substantially similar size; or the synthetic beads may be configured with a size about 200 µm for attracting to the mineral particles, e.g., having a substantially similar size.

Hydrophobicity

According to some embodiments of the present invention, the surface of the synthetic bubbles or beads may be functionalized to be hydrophobic so as to provide a bonding between the surface and a mineral particle associated with one or more hydrophobic molecules.

Furthermore, the polymer can be naturally hydrophobic or functionalized to be hydrophobic. Therefore, the terms "polymer bubbles or beads" and "synthetic bubbles or beads" may be used interchangeably herein. Some polymers having a long hydrocarbon chain or silicon-oxygen backbone, for example, tend to be hydrophobic. Hydrophobic polymers include polystyrene, poly(d,l-lactide), poly(dimethylsiloxane), polypropylene, polyacrylic, polyethylene, etc. The mineral particle of interest or the valuable material associated with one or more hydrophobic molecules is referred to as a wetted mineral particle. When the pulp slurry contains a plurality of collectors or collector molecules, some of the mineral particles will become wetted mineral particles if the collectors are attached to mineral particles. Xanthates can be used in the pulp slurry as the collectors. The bubbles or beads can be made of glass to be coated with hydrophobic silicone polymer including polysiloxanates so that the bubbles or beads become hydrophobic. The bubbles or beads can be made of metal to be coated with silicone alkyd copolymer, for example, so as to render the bubbles or beads hydrophobic. The bubbles or beads can be made of ceramic to be coated with fluoroalkylsilane, for example, so as to render the bubbles and hydrophobic. The bubbles or beads can be made of hydrophobic polymers, such as polystyrene and polypropylene to provide the desired hydrophobicity.

Combined Collector/Hydrophobic Beads/Bubbles

According to some embodiments of the present invention, a part of the surface of the synthetic bubbles or beads may be configured to have the molecules attached thereto, wherein the molecules comprise collectors.

According to some embodiments of the present invention, a part of the surface of the synthetic bubbles or beads may be configured to have the molecules attached thereto, wherein the molecules comprise collectors, and another part of the surface of the synthetic bubbles or beads may be configured to be hydrophobic.

According to some embodiments of the present invention, a part of the surface of the synthetic bubbles or beads may be configured to be hydrophobic.

BRIEF DESCRIPTION OF THE DRAWING

Referring now to the drawing, which are not necessarily drawn to scale, the foregoing and other features and advantages of the present invention will be more fully understood from the following detailed description of illustrative embodiments, taken in conjunction with the accompanying drawing in which like elements are numbered alike:

FIG. 2c is a diagram of a lightweight bead in the form of a hollow cylinder according to some embodiments of the present invention.

FIG. 2d is a diagram of a lightweight bead in the form of a hollow sphere according to some embodiments of the present invention.

FIG. 3 is a diagram of a flotation cell or column that may be used in place of the flotation cell or column that forms part of the flotation system, process or apparatus shown in FIG. 1 according to some embodiments of the present invention.

DETAILED DESCRIPTION OF THE INVENTION

FIG. 1

Figure 1:
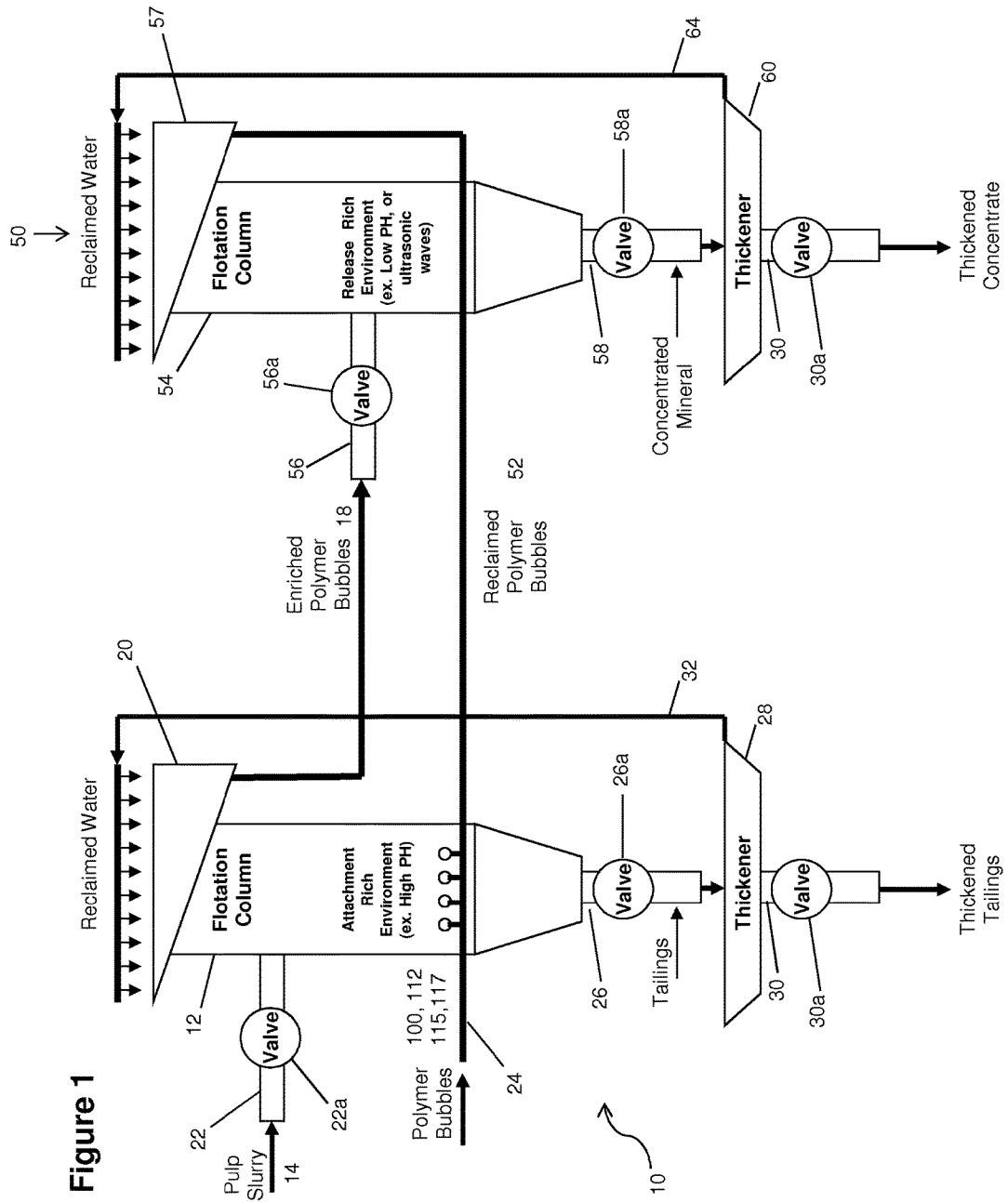
FIG. 1 is a diagram of a flotation system, process or apparatus according to some embodiments of the present invention.

By way of example, FIG. 1 shows the present invention is the form of apparatus 10, having a flotation cell or column 12 configured to receive a mixture of fluid (e.g. water), valuable material and unwanted material, e.g., a pulp slurry 14; receive synthetic bubbles or beads 100 (FIG. 2a), 112 (FIG. 2b), 115 (FIG. 2c), 117 (FIG. 2d) that are constructed to be buoyant when submerged in the pulp slurry or mixture 14 and functionalized to control the chemistry of a process being performed in the flotation cell or column, including to attach to the valuable material in the pulp slurry or mixture 14; and provide enriched synthetic bubble or beads 18 having the valuable material attached thereon. By way of example, the synthetic bubbles or beads 100 (FIG. 2a), 112 (FIG. 2b), 115 (FIG. 2c), 117 (FIG. 2d) may be made from polymer or polymer-based materials, or silica or silica-based materials, or glass or glass-based materials, although the scope of the invention is intended to include other types or kinds of material either now known or later developed in the future. For the purpose of describing one example of the present invention, in FIG. 1 the synthetic bubbles or beads 100 (FIG. 2a), 112 (FIG. 2b), 115 (FIG. 2c), 117 (FIG. 2d) are shown as polymer or polymer-based bubbles labeled 100, 112, 115, 117, and the enriched synthetic bubble or beads 18 are shown as enriched polymer or polymer-based bubbles labeled 18. The flotation cell or column 12 is configured with a top portion or piping 20 to provide the enriched polymer or polymer-based bubbles 18 from the flotation cell or column 12 for further processing consistent with that set forth herein.

The flotation cell or column 12 may be configured with a top part or piping 22, e.g., having a valve 22a, to receive the pulp slurry or mixture 14 and also with a bottom part or piping 24 to receive the polymer or polymer-based bubbles 100, 112, 115, 117. In operation, the buoyancy of the polymer or polymer-based bubbles 100, 112, 115, 117 causes them to float upwardly from the bottom to the top of the flotation cell or column 12 through the pulp slurry or mixture 14 in the flotation cell or column 12 so as to collide with the water, valuable material and unwanted material in the pulp slurry or mixture 14. The functionalization of the polymer or polymer-based bubbles 100, 112, 115, 117 causes them to attach to the valuable material in the pulp slurry or mixture 14. As a result of the collision between the polymer or polymer-based bubbles 100, 112, 115, 117 and the water, valuable material and unwanted material in the pulp slurry or mixture 14, and the attachment of the polymer or polymer-based bubbles 100, 112, 115, 117 and the valuable material in the pulp slurry or mixture 14, the enriched polymer or polymer-based bubbles 18 having the valuable material attached thereto will float to the top of the flotation cell 12 and form part of the froth formed at the top of the flotation cell 12. The flotation cell 12 may include a top part or piping 20 configured to provide the enriched polymer or polymer-based bubbles 18 having the valuable material attached thereto, which may be further processed consistent with that set forth herein. In effect, the enriched polymer or polymer-based bubbles 18 may be taken off the top of the flotation cell 12 or may be drained off by the top part or piping 20.

The flotation cell or column 12 may be configured to contain an attachment rich environment, including where the attachment rich environment has a high pH, so as to encourage the flotation recovery process therein. The flotation recovery process may include the recovery of ore particles in mining, including copper. The scope of the invention is not intended to be limited to any particular type or kind of flotation recovery process either now known or later developed in the future. The scope of the invention is also not intended to be limited to any particular type or kind of mineral of interest that may form part of the flotation recovery process either now known or later developed in the future.

According to some embodiments of the present invention, the polymer or polymer-based bubbles 100, 112, 115, 117 may be configured with a surface area flux by controlling some combination of the size of the polymer or polymer-based bubbles 100, 112, 115, 117 and/or the injection rate that the pulp slurry or mixture 14 is received in the flotation cell or column 12. The polymer or polymer-based bubbles 100, 112, 115, 117 may also be configured with a low density so as to behave like air bubbles. The polymer or polymer-based bubbles 100, 112, 115, 117 may also be configured with a controlled size distribution of medium that may be customized to maximize recovery of different feed matrixes to flotation as valuable material quality changes, including as ore quality changes.

According to some embodiments of the present invention, the flotation cell or column 12 may be configured to receive the polymer or polymer-based bubbles 100, 112, 115, 117 together with air, where the air is used to create a desired froth layer in the mixture in the flotation cell or column 12 in order to achieve a desired grade of valuable material. The polymer or polymer-based bubbles 100, 112, 115, 117 may be configured to lift the valuable material to the surface of the mixture in the flotation cell or column.

The Thickener 28

The apparatus 10 may also include piping 26 having a valve 26a for providing tailings to a thickener 28 configured to receive the tailings from the flotation cell or column 12. The thickener 28 includes piping 30 having a valve 30a to provide thickened tailings. The thickener 28 also includes suitable piping 32 for providing reclaimed water back to the flotation cell or column 12 for reuse in the process. Thickeners like element 28 are known in the art, and the scope of the invention is not intended to be limited to any particular type or kind either now known or later developed in the future.

The Bead Recovery Process or Processor 50

According to some embodiments of the present invention, the apparatus 10 may further comprises a bead recovery process or processor generally indicated as 50 configured to receive the enriched polymer or polymer-based bubbles 18 and provide reclaimed polymer or polymer-based bubbles 52 without the valuable material attached thereon so as to enable the reuse of the polymer or polymer-based bubbles 52 in a closed loop process. By way of example, the bead recovery process or processor 50 may take the form of a washing station whereby the valuable mineral is mechanically, chemically, or electro-statically removed from the polymer or polymer-based bubbles 18.

The bead recovery process or processor 50 may include a second flotation cell or column 54 having piping 56 with a valve 56a configured to receive the enriched polymer bubbles or beads 18; and substantially release the valuable material from the polymer bubbles or beads 18, and also having a top part or piping 57 configured to provide the reclaimed polymer bubbles or beads 52, substantially without the valuable material attached thereon The second flotation cell or column 54 may be configured to contain a release rich environment, including where the release rich environment has a low pH, or including where the release rich environment results from ultrasonic waves pulsed into the second flotation cell or column 54.

The bead recovery process or processor 50 may also include piping 58 having a valve 56a for providing concentrated minerals to a thickener 60 configured to receive the concentrated minerals from the flotation cell or column 54. The thickener 60 includes piping 62 having a valve 62a to provide thickened concentrate. The thickener 60 also includes suitable piping 64 for providing reclaimed water back to the second flotation cell or column 54 for reuse in the process. Thickeners like element 60 are known in the art, and the scope of the invention is not intended to be limited to any particular type or kind either now known or later developed in the future.

Embodiments are also envisioned in which the enriched synthetic beads or bubbles are placed in a chemical solution so the valuable material is dissolved off, or are sent to a smelter where the valuable material is burned off, including where the synthetic beads or bubbles are reused afterwards.

FIGS. 2a-2d: The Synthetic Bubbles or Beads

Figures 2A, 2B:
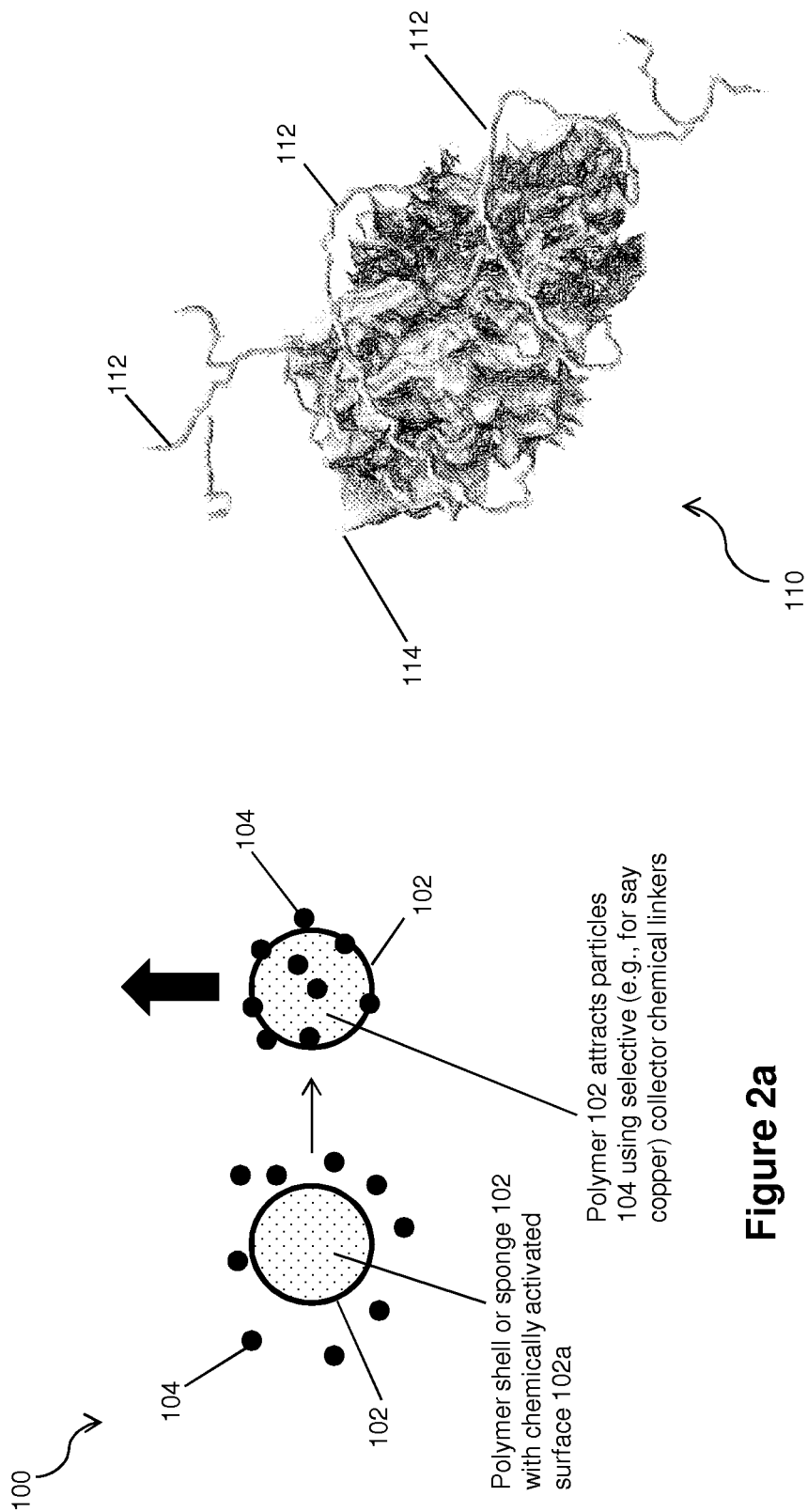
FIG. 2a is a diagram of a lightweight bead having a polymer shell or sponge with a chemically activated light surface according to some embodiments of the present invention.
FIG. 2b is a diagram of a polymer material having tailored collector molecules according to some embodiments of the present invention.

FIG. 2a shows the synthetic bubbles or beads 100 (FIG. 2a), 112 (FIG. 2b), 115 (FIG. 2c), 117 (FIG. 2d) in the form of a lightweight polymer or polymer-based bubble or bead generally indicated as 100 having a polymer shell or sponge 102 with a chemically activated light surface 102a according to some embodiments of the present invention. The polymer shell or sponge 102 attracts particles 104 (i.e. valuable material) using selective (e.g., for copper) collective chemical linkers.

The lightweight polymer or polymer-based bead or bubble 100 are designed to incorporate air bubbles and to attract mineral rich ore (to be recovered) onto their surface 102a and then float to the top of the flotation tank, e.g. 12 (FIG. 1). The benefits of this approach include the fact that polymer blocks, such as the lightweight polymer or polymer-based bead or bubble 100, enables a much larger range of ore grains to be lifted to the surface hence improving recover efficiency. Optimally sized polymer blocks, such as the lightweight polymer or polymer-based bead or bubble 100, with a high percentage of air may be produced with the appropriate collector chemicals also encapsulated into the polymer. Once the polymer blocks are in, e.g., a mixture such as a slurry pulp, the collector chemicals may be released to initially attract mineral rich ore particles and then rise to the surface.

FIG. 2b shows the synthetic bubble or bead that forms part of a combination generally indicated as 110 that includes a polymer or polymer-based material 112 wrapping around an ore rich particle 114, aka valuable material to be recovered. The polymer or polymer-based material 112 may have, or take the form of, tailored collector molecules. The polymer or polymer-based material 112 provides a super wetability concept, using the tailored collector molecules to improve wetability of the ore rich particles 114, e.g., to improve the take up of ore rich particles 114 of varying sizes in the froth, which is likely to work well for smaller particles. The polymer or polymer-based material 112 with functional groups may be used that bind well to the mineral rich particles 114 with a low polar functionality. In addition, the polymer or polymer-based material 112 may take the form of a linear oligomer/low molecular weight polymer that may be used to wrap around ore rich particles 114 making them more hydrophobic and hence more likely to float when foamed, as shown in FIG. 2b.

FIGS. 2c and 2d show the synthetic bubbles or beads as hollow objects, bodies, elements or structures, each generally indicated as 115 (FIG. 2a) or 117 (FIG. 2d). The synthetic bubbles or beads may include a multiplicity of the hollow objects, bodies, elements or structures 115 (FIG. 2a) or 117 (FIG. 2d) configured with a respective cavity, unfilled space, or hole indicated as 115a (FIG. 2c) or 117a (FIG. 2d) to trap and maintain one or more bubbles 116 inside. See PCT/US2011/32697, filed 15 Apr. 2011, which is hereby incorporated by reference in its entirety.

The multiplicity of hollow objects, bodies, elements or structures may include hollow cylinders like element 115 (FIG. 2c) or spheres like 117 (FIG. 2d), as well as capillary tubes, or some combination thereof. The scope of the invention is not intended to be limited to the type, kind or geometric shape of the hollow object, body, element or structure or the uniformity of the mixture of the same. Each hollow object, body, element or structure 115 (FIG. 2c) or 117 (FIG. 2d) may be configured with a dimension so as not to absorb liquid, including water, including where the dimension is in a range of about 20-30 microns. Each hollow object, body, element or structure 115 (FIG. 2a) or 117 (FIG. 2b) may be made of glass or a glass-like material, as well as some other suitable material either now known or later developed in the future.

By way of example, the multiplicity of hollow objects, bodies, elements or structures like 115 (FIG. 2c) or 117 (FIG. 2d) that are received in the mixture may include a number in a range of multiple thousands of bubbles or beads per cubic foot of mixture, although the scope of the invention is not intended to be limited per se to the specific number of bubbles. For instance, a mixture of about three thousand cubic feet may include multiple millions of bubbles or beads, e.g., having a size of about 1 millimeter, in three thousand cubic feet of the mixture.

The multiplicity of hollow objects, bodies, elements or structures like 115 (FIG. 2c) or like 117 (FIG. 2d) may be configured with chemicals applied to prevent migration of liquid into respective cavities, unfilled spaces or holes before the wet concrete mixture cures, including where the chemicals are hydrophobic chemicals.

The one or more bubbles 116 may take the form of a small quantity of gas, including air, that is trapped or maintained in the cavities, unfilled spaces, or holes 115a or 117a of the multiplicity of hollow objects, bodies, elements or structures.

The scope of the invention is intended to include the synthetic bubbles shown herein being made from a polymer or polymer-based material, or a silica or silica-based, or a glass or glass-based material. In this case, the one or more hollow cylinders like 115 may also include hollow glass cylinders manufactured using a drawing and dicing process.

Dosage Control

According to some embodiments of the present invention, the synthetic beads or bubbles 100, 112, 115, 117 may be functionalized to control the chemistry of the process being performed in the cell or column, e.g. to release a chemical to control the chemistry of the flotation separation process.

In particular, the flotation cell or column 12 in FIG. 1 may be configured to receive polymer-based blocks like elements 100, 112, 115, 117 of materials containing one or more chemicals used in a flotation separation of the valuable material, including mining ores, that are encapsulated into polymers to provide a slow or targeted release of the chemical once released into the flotation cell or column 12.

By way of example, the one or more chemicals may include chemical mixes both now known and later developed in the future, including typical frothers, collectors and other additives used in flotation separation. The scope of the invention is not intended to be limited to the type or kind of chemicals or chemical mixes that may be released into the flotation cell or column 12 using the synthetic bubbles according to the present invention.

The scope of the invention is intended to include other types or kinds of functionalization of the synthetic beads or bubbles in order to provide other types or kinds of control of the chemistry of the process being performed in the cell or column, including either functionalizations and controls both now known and later developed in the future. For example, the synthetic beads or bubbles may be functionalized to control the pH of the mixture that forms part of the flotation separation process being performed in the flotation cell or column.

FIG. 3: The Collision Technique

FIG. 3 shows alternative apparatus generally indicated as 200 in the form of an alternative flotation cell 201 that is based at least partly on a collision technique between the mixture and the synthetic bubbles or beads, according to some embodiments of the present invention. The mixture 202, e.g. the pulp slurry, may be received in a top part or piping 204, and the synthetic bubbles or beads 206 may be received in a bottom part or piping 208. The flotation cell 201 may be configured to include a first device 210 for receiving the mixture 202, and also may be configured to include a second device 212 for receiving the polymer-based materials. The first device 210 and the second device 212 are configured to face towards one another so as to provide the mixture 202 and the synthetic bubbles or beads 206, e.g., polymer or polymer-based materials, using the collision technique. In FIG. 3, the arrows 210a represent the mixture being sprayed, and the arrows 212a represent the synthetic bubbles or beads 206 being sprayed towards one another in the flotation cell 201.

In operation, the collision technique causes vortices and collisions using enough energy to increase the probability of touching of the polymer or polymer-based materials 206 and the valuable material in the mixture 202, but not too much energy to destroy bonds that form between the polymer or polymer-based materials 206 and the valuable material in the mixture 202. Pumps, not shown, may be used to provide the mixture 202 and the synthetic bubbles or beads 206 are the appropriate pressure in order to implement the collision technique.

By way of example, the first device 210 and the second device 212 may take the form of shower-head like devices having a perforated nozzle with a multiplicity of holes for spraying the mixture and the synthetic bubbles or beads towards one another. Shower-head like devices are known in the art, and the scope of the invention is not intended to be limited to any particular type or kind thereof either now known or later developed in the future. Moreover, based on that disclosed in the instant patent application, a person skilled in the art without undue experimentation would be able to determine the number and size of the holes for spraying the mixture 202 and the synthetic bubbles or beads 206 towards one another, as well as the appropriate pumping pressure in order to provide enough energy to increase the probability of touching of the polymer or polymer-based materials 206 and the valuable material in the mixture 202, but not too much energy to destroy bonds that form between the polymer or polymer-based materials 206 and the valuable material in the mixture 202.

As a result of the collision between the synthetic bubbles or beads 206 and the mixture, enriched synthetic bubbles or beads having the valuable material attached thereto will float to the top and form part of the froth in the flotation cell 201. The flotation cell 201 may include a top part or piping 214 configured to provide enriched synthetic bubbles or beads 216, e.g., enriched polymer bubbles as shown, having the valuable material attached thereto, which may be further processed consistent with that set forth herein.

The alternative apparatus 200 may be used in place of the flotation columns or cells, and inserted into the apparatus or system shown in FIG. 1, and may prove to be more efficient than using the flotation columns or cells.

Figure 4B:
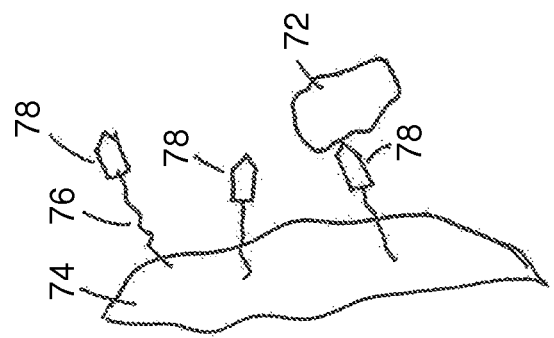
FIG. 4b illustrates an enlarged portion of the synthetic bead showing a molecule or molecular segment for attaching a function group to the surface of the synthetic bead, according to some embodiments of the present invention.
Figure 4A:
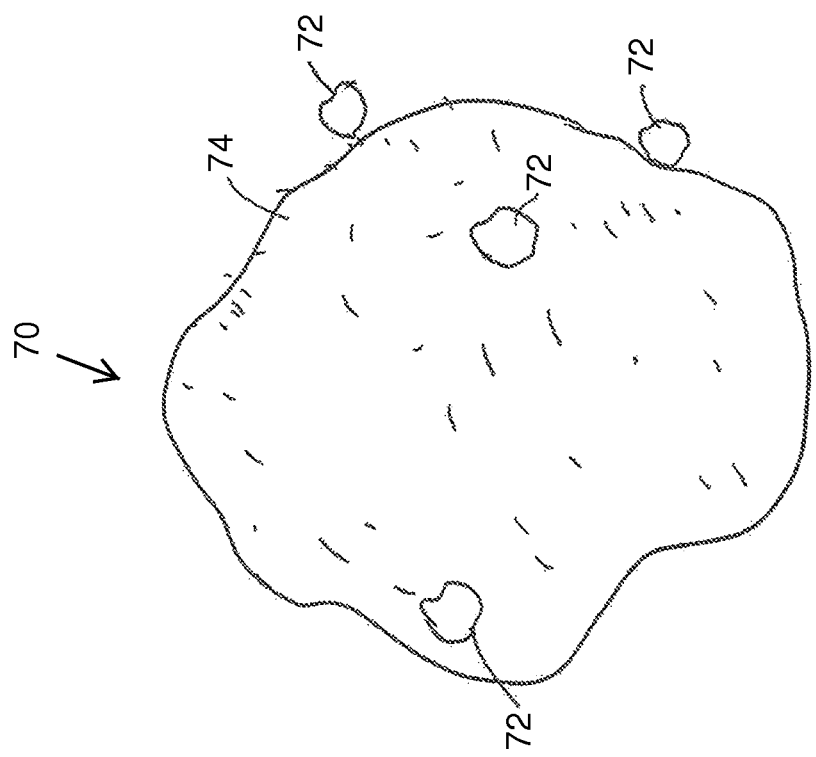
FIG. 4a shows a generalized synthetic bead which can be a size-based bead or bubble, weight-based polymer bead and bubble, and magnetic-based bead and bubble, according to some embodiments of the present invention.

FIGS. 4a, 4b: The Synthetic Bead Chemistry

For aiding a person of ordinary skill in the art in understanding various embodiments of the present invention, FIG. 4a shows a generalized synthetic bead and FIG. 4b shows an enlarged portion of the surface. As shown in FIGS. 4a and 4b, the synthetic bead 70 has a bead body to provide a bead surface 74. At least the outside part of the bead body may be made of a synthetic material, such as polymer, so as to provide a plurality of molecules or molecular segments 76 on the surface 74. The molecule 76 is used to attach a chemical functional group 78 to the surface 74. In general, the molecule 76 can be a hydrocarbon chain, for example, and the functional group 78 can have an anionic bond for attracting a mineral, such as copper to the surface 74. A xanthate, for example, has both the functional group 78 and the molecular segment 76 to be incorporated into the polymer that is used to make the synthetic bead 70. The functional group 78 is also known as a collector that can have a non-ionizing or ionizing bond. The ionizing bond can be anionic or cationic. An anionic bond includes oxyhydryl, such as carboxylic, sulfates and sulfonates, and sulfhydral, such as xanthates and dithiophosphates. Other molecules or compounds that can be used to provide the function group 78 include thionocarboamates, thioureas, xanthogens, monothiophosphates, hydroquinones and polyamines.

Similarly, a chelating agent can be incorporated into the polymer as a collector site for attracting a mineral, such as copper. As shown in FIG. 4b, a mineral particle 72 is attached to the functional group 78 on the molecule 76. In general, the mineral particle 72 is much smaller than the synthetic bead 70. Many mineral particles 72 can be attracted to or attached to the surface 74 of a synthetic bead 70. When the mineral particles 72 are very fine, smaller synthetic beads 70 can also be used.

In some embodiments of the present invention, a synthetic bead may take the form of a solid-phase body made of a synthetic material, such as polymer. (By way of example, the term "solid-phase body" is understood herein to be a body having a cohesive force of matter that is strong enough to keep the molecules or atoms in the given positions, restraining the thermal mobility.) The polymer can be rigid or elastomeric. An elastomeric polymer can be a bisoxazolone-based polymer, for example. The body has a surface comprising a plurality of molecules with one or more functional groups for attracting mineral particles of interest to the surface. A polymer having a functional group to attract or collect mineral particles is referred to as a functionalized polymer. By way of example, the entire body of the synthetic bead may be made of the same functionalized material, or the bead body may be a shell, which can be formed by way of expansion, such as thermal expansion or pressure reduction.

The shell may be formed as a micro-bubble or a balloon. The shell, which may be made of functionalized material, may have an interior part. The interior part may be filled with air or gas to aid buoyancy, for example. The interior part can be used to contain a liquid to be released during the mineral separation process, in order to control the chemistry of the process being performed, e.g., in the flotation cell or column. The encapsulated liquid can be a polar liquid or a non-polar liquid, for example. The encapsulated liquid can contain a depressant composition for the enhanced separation of copper, nickel, zinc, lead in sulfide ores in the flotation stage, for example. The shell can be used to encapsulate a powder which can have a magnetic property so as to cause the synthetic bead to be magnetic, for example. In such embodiments, an electromagnetic field may be generated to capture or stir the synthetic beads. The encapsulated liquid or powder may contain monomers, oligomers or short polymer segments for wetting the surface of mineral particles when released from the beads. For example, each of the monomers or oligomers may contain one functional group for attaching to a mineral particle of interest and one ionic bond for attaching the wetted mineral particle to the synthetic bead. The shell can be used to encapsulate a solid core, such as Styrofoam to aid buoyancy, for example. In yet another embodiment, only the coating of the bead body may be made of functionalized polymer. The synthetic bead can have a core made of ceramic, glass or metal and only the surface of core can have a coating made of functionalized polymer. The core can be a hollow core or a filled core depending on the applications. The core can be a micro-bubble, a sphere or balloon. For example, a filled core made of metal makes the density of the synthetic bead to be higher than the density of the pulp slurry, for example, so as to settle in the flotation cell or column and be capture. The core can be made of a magnetic material so that the para-, ferri-, ferro-magnetism of the synthetic bead is greater than the para-, ferri-, ferro-magnetism of the unwanted ground ore particle in the mixture. According to some embodiments, the synthetic bead can be configured with a ferro-magnetic or ferri-magnetic core that attract to para-magnetic surfaces. A core made of glass or ceramic can be used to make the density of the synthetic bead substantially equal to the density of the pulp slurry so that when the synthetic beads are mixed into the pulp slurry for mineral collection, the beads can be in a so-called suspension state.

It should be understood that the use of the term "bead" is not intended to limit the shape of the synthetic bead of the present invention to being spherical, as shown in FIG. 4a, 4b. In various embodiments of the present invention, the synthetic bead can have an elliptical shape, a cylindrical shape, a shape of a block, an irregular shape. In effect, the scope of the invention is not intended to be limited to any particular type or kind of shape of the synthetic bead.

It should also be understood that the surface of a synthetic bead, according to the present invention, is not limited to an overall smoothness of its surface as shown in FIG. 4a. In some embodiments of the present invention, the surface can be irregular and rough. For example, the surface can have some physical structures like grooves or rods, or holes or dents. The surface can have some physical structures formed from stacked beads. The surface can have some hair-like physical structures. In addition to the functional groups on the synthetic beads that attract mineral particles of interest to the bead surface, the physical structures can help trapping the mineral particles on the bead surface. The surface can be configured to be a honeycomb surface or a sponge-like surface for trapping the mineral particles and/or increasing the contacting surface. In effect, the scope of the invention is not intended to be limited to any particular type or kind of surface of the synthetic bead.

It should be noted that the synthetic beads of the present invention can be realized by a different way to achieve the same goal. Namely, it is possible to use a different means to attract the mineral particles of interest to the surface of the synthetic beads. For example, the surface of the polymer beads or shells can be functionalized with a hydrophobic chemical molecule or compound, as discussed below. Alternatively, the surface of beads made of glass, ceramic and metal can be coated with hydrophobic chemical molecules or compounds. Using the coating of glass beads as an example, polysiloxanates can be used to functionalize the glass beads in order to make the synthetic beads. In the pulp slurry, xanthate and hydroxamate collectors can also be added therein for collecting the mineral particles and making the mineral particles hydrophobic. When the synthetic beads are used to collect the mineral particles in the pulp slurry having a pH value around 8-9, it is possible to release the mineral particles on the enriched synthetic beads from the surface of the synthetic beads in an acidic solution, such as a sulfuric acid solution. According to some embodiment, it may also be possible to release the mineral particles carried with the enriched synthetic beads by sonic agitation, such as ultrasonic waves, or simply by washing it with water.

Figure 5B:
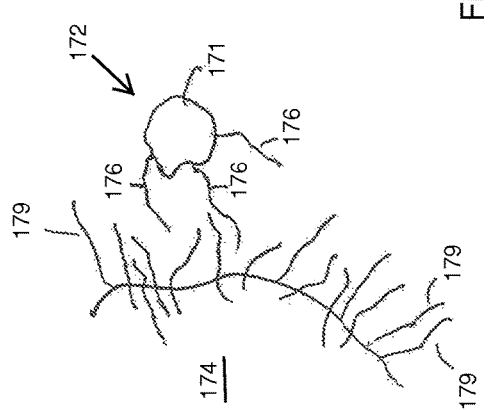
FIG. 5b illustrates an enlarged portion of the synthetic bead showing a wetted mineral particle attached to the hydrophobic surface of the synthetic bead, according to some embodiments of the present invention.
Figure 5C:
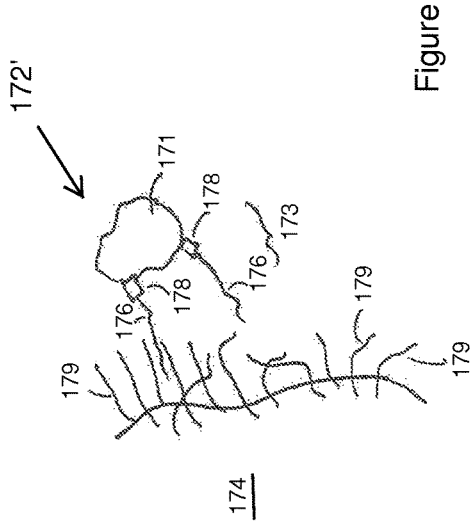
FIG. 5c illustrates an enlarged portion of the synthetic bead showing a hydrophobic particle attached to the hydrophobic surface of the synthetic bead.
Figure 5A:
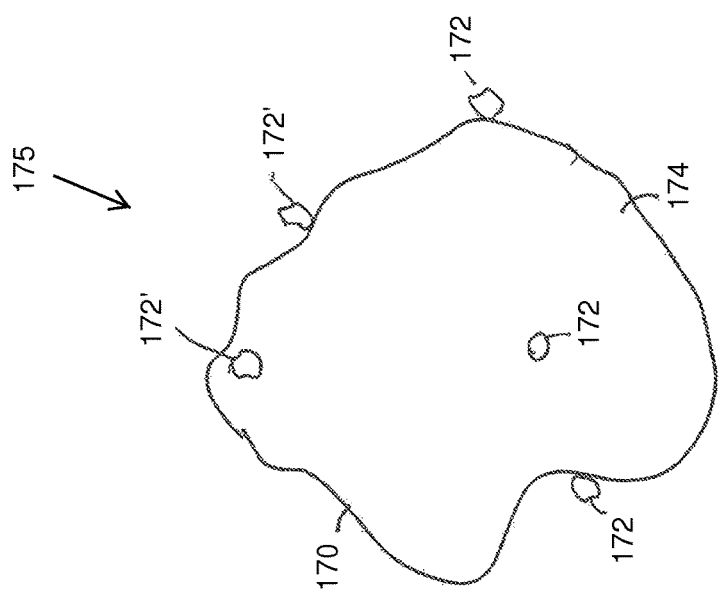
FIG. 5a shows a generalized synthetic bubble or bead having some particles attached to the surface, according to some embodiments of the present invention.

FIGS. 5a to 5c: Hydrophobicity

For aiding a person of ordinary skill in the art in understanding various embodiments of the present invention, FIG. 5a shows a generalized synthetic bubble or bead having some particles attached to the surface. FIG. 5b illustrates an enlarged portion of the synthetic bead showing a wetted mineral particle attached to the hydrophobic surface of the synthetic bead. FIG. 5c illustrates an enlarged portion of the synthetic bead showing a hydrophobic particle attached to the hydrophobic surface of the synthetic bead.

The hydrophobic particle can be mineral related or non-mineral related. The synthetic bead can be a size-based bead or bubble, weight-based polymer bead and bubble, or magnetic-based bead and bubble, consistent with that set forth herein.

The size of the synthetic bead can be smaller than the minimum size of the mineral particles of interest which is about 150 µm, and can be larger than the maximum size of the mineral particles of interest. In certain applications, the size of the synthetic bead can be 1 cm or larger.

As shown in FIG. 5a, the synthetic bubble or bead 170 may have a bead body to provide a bead surface 174. At least the outside part of the bead body is made of a synthetic material, such as a hydrophobic polymer, or a coating of a hydrophobic chemical. As such, hydrophobic particles 172, 172' are attracted to the surface 174 to form an enriched synthetic bubble or bead 175. As shown in FIGS. 5a and 5b, the surface 174 of the synthetic bubble or bead comprises a plurality of molecules 179 which renders the surface 174 hydrophobic. For example, the surface 174 may be a glass surface coated with polysiloxanates which have functional groups that bind to the hydroxyl group of the glass surface. Polysiloxanates, such as hydroxyl-terminated polydimethysiloxanes, have a silicon-oxygen chain to provide the hydrophobic molecules 179. The hydrophobic particle 172', as shown in FIG. 5b, can be a mineral particle 171' having one or more collectors 173 attached thereto. One end (178) of the collector 173 has an ionic bond attached to the mineral particle of interest 171'. The other end of the collector 173 has a hydrophobic chain 176 which tends to move into the hydrophobic molecules 179. Thus, the hydrophobic particle 172' can be a wetted mineral particle. A collector, such as xanthate, has both the functional group 178 and the molecule 176. A xanthate, for example, has both the functional group 178 and the molecular segment 176 to be incorporated into the polymer that is used to make the synthetic bead 170. A functional group 178 is also known as a collector that can have a non-ionizing or ionizing bond. The ionizing bond can be anionic or cationic. An anionic bond includes oxyhydryl, such as carboxylic, sulfates and sulfonates, and sulfhydral, such as xanthates and dithiophosphates. Other molecules or compounds that can be used to provide the function group 178 include thionocarboamates, thioureas, xanthogens, monothiophosphates, hydroquinones and polyamines.

The hydrophobic particle 172, as shown in FIG. 5c, can be a particle that has a hydrophobic chain 176. Such particle can be non-mineral related, but it can be arranged to contact with the hydrophobic synthetic bubbles or beads 170 of the present inventions. Thus the hydrophobic bubbles or beads 170, according to various embodiments of the present invention, can be used in non-mining applications, such as water-pollution control and water purification.

pH

In many releasing environments, the pH value is lower than the pH value for mineral attachment. It should be noted that, however, when the valuable material is copper, for example, it is possible to provide a lower pH environment for the attachment of mineral particles and to provide a higher pH environment for the releasing of the mineral particles from the synthetic beads or bubbles. In general, the pH value is chosen to facilitate the strongest attachment, and a different pH value is chosen to facilitate release. Thus, according to some embodiments of the present invention, one pH value is chosen for mineral attachment, and a different pH value is chosen for mineral releasing. The different pH could be higher or lower, depending on the specific mineral and collector.

Bead Size (Range)

The synthetic beads, according to some embodiments of the present invention, can be made with different sizes in order to attract mineral particles of different sizes. For example, unlike air bubbles, the synthetic beads of a larger size can be used to attract mineral particles larger than, say, 200 µm. Thus, the grinding of the blasted ore can be separated into different stages. In the first stage, the rock is crushed into particles in the order of 200 µm. After the separation process using the larger synthetic beads in the slurry containing these crude particles, the remaining slurry can be subjected to a finer grinding stage where the crushed rock is further crushed into particles in the order of 100 µm. With the slurry containing the finer mineral particles, synthetic beads with a smaller size may be more effective in interacting with the finer mineral particles. In a flotation cell application, the bead size can be smaller than 100 µm. In a tailings pond application, the bead size can be 1 mm to 10 mm or larger. However, large beads would reduce the functionalized surfaces where the mineral particles can attach to the synthetic beads. Thus, according to some embodiments of the present invention, the synthetic beads are configured with a size less than 100 µm for attracting to mineral particles having a substantially similar size, including in applications related to flotation cells; the synthetic beads are configured with a size of about 100 µm for attracting or attaching to mineral particles having a substantially similar size, smaller size or larger size; the synthetic beads are configured with a size in a range of about 50-500 µm for attracting or attaching to mineral particles having a substantially similar size, smaller size or larger size; the synthetic beads are configured with a size about 200 µm for attracting to mineral particles having a substantially similar size; the synthetic beads are configured with a size in a range of about 1 mm to 10 mm, including in applications related to a tailings pond. In general, the synthetic beads are configured with a size in a range of about 50 µm to 10 mm. But the beads can be smaller than 50 µm and larger than 10 mm.

Relative Size

According to some embodiments of the present invention, the synthetic beads are configured to be larger than the mineral particles. As such, a plurality of mineral particles may attach to one synthetic bead. According to other embodiments of the present invention, the synthetic beads are configured to be smaller than the mineral particles. As such, a plurality of synthetic beads may attach to one mineral particle. The size of the synthetic beads can also be about the same as the size of the mineral particle.

Oilsands Separation

It should be understood that the synthetic beads according to the present invention, whether functionalized to have a collector or functionalized to be hydrophobic, are also configured for use in oilsands separation—to separate bitumen from sand and water in the recovery of bitumen in an oilsands mining operation. Likewise, the functionalized filters and membranes, according to some embodiments of the present invention, are also configured for oilsands separation.

Portion of Surface Functionalized

According to some embodiments of the present invention, only a portion of the surface of the synthetic bead is functionalized to be hydrophobic. This has the benefits as follows:
1. Keeps too many beads from clumping together—or limits the clumping of beads,
2. Once a mineral is attached, the weight of the mineral is likely to force the bead to rotate, allowing the bead to be located under the bead as it rises through the flotation cell;
  a. Better cleaning as it may let the gangue to pass through
  b. Protects the attached mineral particle or particles from being knocked off, and
  c. Provides clearer rise to the top collection zone in the flotation cell.

According to some embodiments of the present invention, only a portion of the surface of the synthetic bead is functionalized with collectors. This also has the benefits of
1. Once a mineral is attached, the weight of the mineral is likely to force the bead to rotate, allowing the bead to be located under the bead as it rises through the flotation cell;
  a. Better cleaning as it may let the gangue to pass through
  b. Protects the attached mineral particle or particles from being knocked off, and
  c. Provides clearer rise to the top collection zone in the flotation cell.

Both Collector and Hydrophobic on Same Bead

Figure 6A:
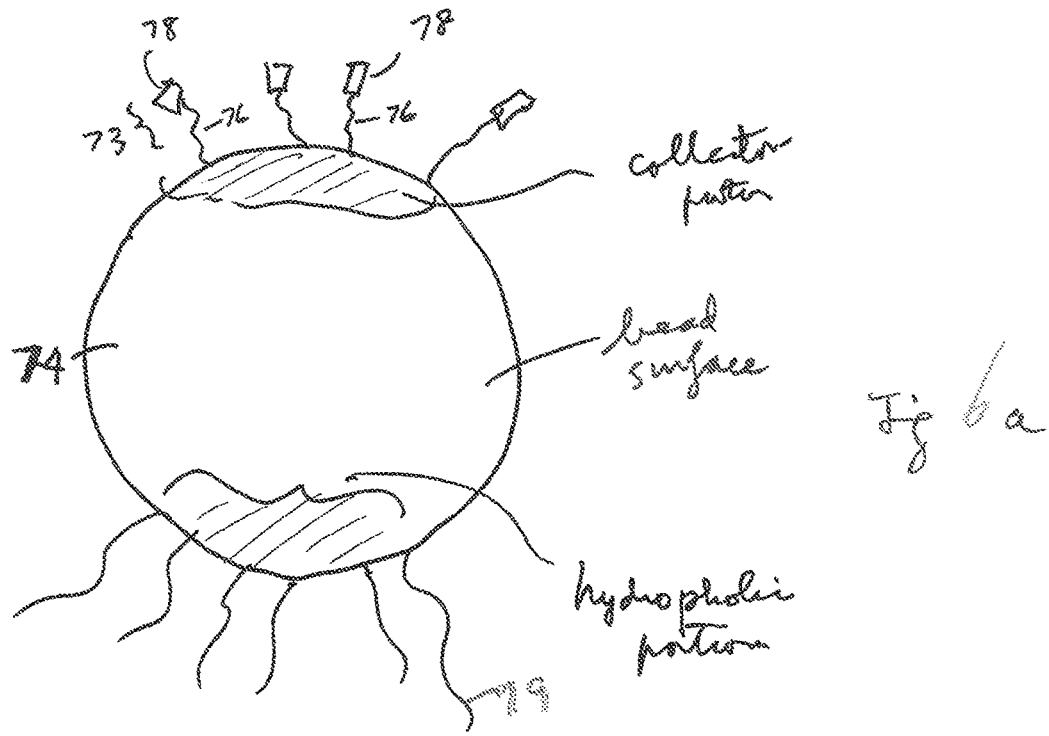
FIGS. 6a and 6b illustrate some embodiments of the present invention wherein the synthetic bead or bubble have one portion functionalized to have collector molecules and another portion functionalized to be hydrophobic.
Figure 6B:
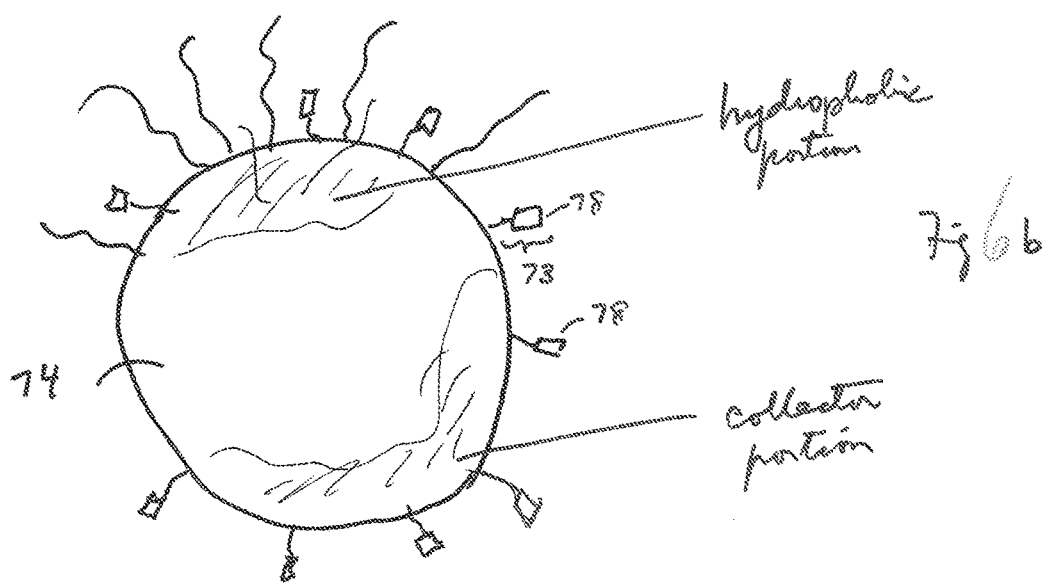

According to some embodiments of the present invention, one part of the synthetic bead is functionalized with collectors while another part of same synthetic bead is functionalized to be hydrophobic as shown in FIGS. 6a and 6b. As shown in FIG. 6a, a synthetic bead 74 has a surface portion where polymer is functionalized to have collector molecules 73 with functional group 78 and molecular segment 76 attached to the surface of the bead 74. The synthetic bead 74 also has a different surface portion where polymer is functionalized to have hydrophobic molecules 179 (or 79). In the embodiment as shown in FIG. 6b, the entire surface of the synthetic bead 74 can be functionalized to have collector molecules 73, but a portion of the surface is functionalized to have hydrophobic molecules 179 (or 79) render it hydrophobic.

This "hybrid" synthetic bead can collect mineral particles that are wet and not wet.

Advantages of Same Bead Having Both Collector Molecules and Hydrophobic Molecules According to some embodiments of the present invention, one part of the synthetic bead is functionalized with collectors while another part of same synthetic bead is functionalized to be hydrophobic and this "hybrid" synthetic bead is configured for use in a traditional flotation cell as well. The "hybrid" synthetic bead (see FIGS. 6a and 6b) has a hydrophobic portion and a separate collector portion. When the "hybrid" beads are mixed with air in the flotation cell, some of them will attach to the air bubbles because of the hydrophobic portion. As the "hybrid" synthetic bead is attached to an air bubble, the collector portion of the attached bead can collect mineral particles with the functional groups. Thus, the synthetic beads, according to some embodiments of the present inventions, can be used to replace the air bubbles, or to work together with the air bubbles in a flotation process.

A Collector

According to some embodiments of the present invention, the surface of a synthetic bead can be functionalized to have a collector molecule. The collector has a functional group with an ion capable of forming a chemical bond with a mineral particle. A mineral particle associated with one or more collector molecules is referred to as a wetted mineral particle. According to some embodiments of the present invention, the synthetic bead can be functionalized to be hydrophobic in order to collect one or more wetted mineral particles.

Retrofitting to Pre-existing Flotation Cells

The scope of the invention is intended to include stand alone applications, as well as retrofitting the technology disclosed herein to pre-existing flotation cells that are operating based on the prior art technology. In the retrofitting application, a flotation cell according to the present invention may be configured, e.g., on the back end of a pre-existing flotation cell.

Moreover, embodiments are also envisioned in which the synthetic bubbles according to the present invention may be used alone or in combination with the air bubbles using in the prior art.

Applications

The scope of the invention is described in relation to mineral separation, including the separation of copper from ore. However, the scope of the invention is intended to include other types or kinds of applications either now known or later developed in the future, e.g., including a flotation circuit, leaching, smelting, a gravity circuit, a magnetic circuit, or water purification, as well as including applications related to oilsands separation that includes separating bitumen from sand and water in the recovery of bitumen in an oilsands mining operation.

The Scope of the Invention

It should be further appreciated that any of the features, characteristics, alternatives or modifications described regarding a particular embodiment herein may also be applied, used, or incorporated with any other embodiment described herein. In addition, it is contemplated that, while the embodiments described herein are useful for homogeneous flows, the embodiments described herein can also be used for dispersive flows having dispersive properties (e.g., stratified flow). Although the invention has been described and illustrated with respect to exemplary embodiments thereof, the foregoing and various other additions and omissions may be made therein and thereto without departing from the spirit and scope of the present invention.

What is claimed is:

1. Apparatus comprising:
a plurality of synthetic beads; and
a flotation cell or column having a top part and a bottom part, the top part configured to receive a mixture of fluid and valuable material and unwanted material; the bottom part configured to receive the synthetic beads from piping connected to the flotation cell or column, the synthetic beads constructed to be buoyant when submerged in the mixture and functionalized to control the chemistry of a process being performed in the flotation cell or column; wherein the flotation cell or column is further configured to provide enriched synthetic beads having the valuable material attached thereto, wherein the value material comprises mineral particles, and wherein the synthetic beads comprise a surface or coating having a hydrophobic polymer of polydimethylsiloxane to attract the valuable material.

2. Apparatus according to claim 1, wherein the synthetic beads are made from either a polymer or polymer-based.

3. Apparatus according to claim 1, wherein the synthetic beads are functionalized to attach to the valuable material in the mixture that forms part of a flotation separation process being performed in the flotation cell or column.

4. Apparatus according to claim 1, wherein the synthetic beads are functionalized to release a chemical to control the chemistry of a flotation separation process.

5. Apparatus according to claim 1, wherein the synthetic beads are configured with firm outer shells functionalized with a chemical to attach to the valuable material in the mixture.

6. Apparatus according to claim 1, wherein the synthetic beads include a chemical that may be released to attach to the valuable material in the mixture.

7. Apparatus according to claim 1, wherein the synthetic beads are constructed with firm outer shells configured to contain a gas, including air, so as to be buoyant when submerged in the mixture.

8. Apparatus according to claim 1, wherein the synthetic beads are made from a low-density material so as to be buoyant when submerged in the mixture.

9. Apparatus according to claim 8, wherein the synthetic beads are configured as a solid without an internal cavity.

10. Apparatus according to claim 1, wherein the synthetic beads comprise a multiplicity of hollow objects, bodies, elements or structures, each configured with a respective cavity, unfilled space, or hole to trap and maintain a gas bubble inside, including air.

11. Apparatus according to claim 10, wherein the hollow objects, bodies, elements or structures comprise hollow cylinders, or spheres, or globules, or capillary tubes, or some combination thereof.

12. Apparatus according to claim 10, wherein each hollow object, body, element or structure is configured with a dimension so as not to absorb liquid, including water, including where the dimension is in a range of about 20-30 microns.

13. Apparatus according to claim 2, wherein the synthetic beads are hollow glass cylinders manufactured using a drawing and dicing process.

14. Apparatus according to claim 10, wherein the multiplicity of hollow objects, bodies, elements or structures is configured with chemicals applied to prevent migration of liquid into respective cavities.

15. Apparatus according to claim 14, wherein the chemicals are hydrophobic chemicals.

16. Apparatus according to claim 2, wherein the polymer or polymer-based material is configured with a surface area flux by controlling some combination of the size of the polymer-based material and/or the injection rate that the mixture is received in the flotation cell or column.

17. Apparatus according to claim 2, wherein the polymer or polymer-based material is configured with a low density so as to behave like air bubbles.

18. Apparatus according to claim 2, wherein the polymer or polymer-based material is configured with a controlled size distribution of medium that may be customized to maximize recovery of different feed matrixes to flotation as valuable material quality changes, including as ore quality changes.

19. Apparatus according to claim 2, wherein the flotation cell or column is configured to receive the polymer or polymer-based materials together with air, where the air is used to create a desired froth layer in the mixture in the flotation cell or column in order to achieve a desired grade of valuable material.

20. Apparatus according to claim 2, wherein the polymer or polymer-based materials are configured to lift the valuable material to the surface of the mixture in the flotation cell or column.

21. Apparatus according to claim 2, wherein the flotation cell or column is configured with a top part, portion or piping to provide the enriched synthetic beads, including where the enriched synthetic beads are in the form of enriched polymer or polymer-based beads.

22. Apparatus according to claim 1, wherein the apparatus further comprises a bead recovery process or processor configured to receive the enriched synthetic beads and provide reclaimed synthetic beads, including where the enriched synthetic beads are in the form of enriched polymer or polymer-based beads, and where the reclaimed enriched synthetic beads are in the form of reclaimed polymer or polymer-based beads.

23. Apparatus according to claim 22, wherein the bead recovery process or processor comprises a washing station whereby the valuable mineral is mechanically, chemically, or electro-statically removed from the enriched synthetic beads.

24. Apparatus according to claim 1, wherein the mixture is a pulp slurry containing water and the valuable material in the form of a mineral of interest.

25. Apparatus according to claim 1, wherein the apparatus further comprises a thickener configured to receive tailings from the bottom part of the flotation cell or column and provide thickened tailings and reclaimed water.

26. Apparatus according to claim 25, wherein the thickener is configured to provide the reclaimed water back to top part of the flotation cell or column.

27. Apparatus according to claim 1, wherein the flotation cell or column is configured to contain an attachment rich environment, including where the attachment rich environment has a high pH.

28. Apparatus according to claim 1, wherein the apparatus further comprises a second flotation cell or column, the second flotation cell or column having piping configured to
receive the enriched synthetic beads, including enriched polymer or polymer-based beads from the top part of the flotation cell or column; the second flotation cell further configured to
substantially release the valuable material from the enriched synthetic beads, including the enriched polymer or polymer-based beads.

29. Apparatus according to claim 28, wherein the second flotation cell or column is configured to provide reclaimed synthetic beads substantially without the valuable material attached thereon to the bottom part of the flotation cell or column.

30. Apparatus according to claim 28, wherein the apparatus further comprises a second thickener configured to receive concentrated minerals from the second flotation cell or column and provide thickened concentrate and reclaimed water.

31. Apparatus according to claim 30, wherein the second thickener is configured to provide the reclaimed water back to the second flotation cell or column.

32. Apparatus according to claim 28, wherein the second flotation cell or column is configured to contain a release rich environment, including where the release rich environment has a low pH, or including where the release rich environment results from ultrasonic waves.

33. Apparatus according to claim 2, wherein polymer or polymer-based beads are each configured with a shell, sponge or "semi-porous" structure that is chemically activated to attract the valuable material, including ore.

34. Apparatus according to claim 33, wherein the polymer or polymer-based beads are configured so that the shell or "semi-porous" structure at or near the surface dissolves so as to be time activated and releases an agent that promotes frothing in the mixture.

35. Apparatus according to claim 2, wherein polymer or polymer-based beads are configured to incorporate air bubbles to attract the valuable material, including mineral rich ore, onto their surface and then float to the top of the flotation cell or column.

36. Apparatus according to claim 2, wherein polymer or polymer-based beads having a predetermined size and a substantially high percentage of air are configured with collector chemicals encapsulated in the polymer or polymer-based materials.

37. Apparatus according to claim 36, wherein the collector chemicals are released to attract the valuable material, including mineral rich ore.

38. Apparatus according to claim 2, wherein polymer or polymer-based beads are each configured with selective collector chemical linkers for attracting the valuable materials.

39. Apparatus according to claim 2, wherein the polymer or polymer-based material includes one or more functional groups that binds well to the valuable material, including mineral rich particles, with low polar functionality.

40. Apparatus according to claim 2, wherein the polymer or polymer-based materials are configured with a linear oligomer/low molecular weight polymer to wrap around the valuable material, including ore rich particles, making them more hydrophobic and more likely to float when foamed.

41. Apparatus according to claim 2, wherein the flotation cell or column is configured to receive polymer-based blocks of materials containing one or more chemicals used in a flotation separation of the valuable material, including mining ores, that are encapsulated into polymers to provide a slow or targeted release of the chemical once released into the flotation cell or column.

42. Apparatus according to claim 41, wherein the one or more chemical comprise chemical mixes including typical frothers, collectors and other additives used in flotation separation.

43. Apparatus according to claim 2, wherein the apparatus further comprises:
a first device for receiving the mixture; and
a second device for receiving polymer or polymer-based beads;
the first device and the second device configured to face towards one another so as to provide the mixture and the polymer or polymer-based beads using a collision technique.

44. Apparatus according to claim 43, wherein the collision technique causes vortices and collisions using enough energy to increase the probability of touching of the polymer or polymer-based beads and the valuable material, but not too much energy to destroy bonds that form between the polymer or polymer-based beads and the valuable material.

45. Apparatus comprising:
a plurality of polymer or polymer-based materials; and
a flotation cell or column having a top part and a bottom part, the top part configured to
receive a mixture of water, valuable material and unwanted material; the bottom part configured to
receive the polymer or polymer-based materials, including polymer or polymer-based beads, from piping connected to the flotation cell or column, the polymer or polymer-based materials configured to attach to the valuable material in the mixture; the flotation cell or column further configured to
provide enriched polymer or polymer-based materials, including enriched polymer or polymer-based beads, having the valuable material attached thereon, wherein the value material comprises mineral particles, and wherein the polymer or polymer-based beads comprise a surface or coating having a hydrophobic polymer of polydimethylsiloxane to attract the valuable material.

46. Apparatus according to claim 45, wherein the polymer or polymer-based material is configured with a surface area flux by controlling some combination of the size of the polymer or polymer-based material and/or the injection rate that the mixture is received in the flotation cell or column.

47. Apparatus according to claim 45, wherein the polymer or polymer-based material is configured with a low density so as to behave like air bubbles.

48. Apparatus according to claim 45, wherein the polymer or polymer-based material is configured with a controlled size distribution of medium that may be customized to maximize recovery of different feed matrixes to flotation as valuable material quality changes, including as ore quality changes.

49. Apparatus according to claim 45, wherein the polymer or polymer-based materials comprises a surface having molecules comprising a functional group selected for attracting or attaching to the valuable material in the mixture.

50. Apparatus according to claim 45, wherein the polymer or polymer-based materials comprises a hydrophobic polymer, or a coating of a hydrophobic chemical.

51. Apparatus according to claim 1, wherein the synthetic beads are made from a synthetic material selected from a group consisting of polyamides (nylon), polyesters, polyurethanes, phenol-formaldehyde, urea-formaldehyde, melamine-formaldehyde, polyacetal, polyethylene, polyisobutylene, polyacrylonitrile, poly(vinyl chloride), polystyrene, poly(methyl methacrylates), poly(vinyl acetate), poly(vinylidene chloride), polyisoprene, polybutadiene, polyacrylates, poly(carbonate) and phenolic resin.

52. Apparatus according to claim 1, a part of the surface of the synthetic beads is configured to have the molecules attached thereto, wherein the molecules comprise collectors.

53. Apparatus according to claim 52, wherein a part of the surface of the synthetic beads is configured to be hydrophobic.

54. Apparatus according to claim 1, wherein the synthetic beads are made from either a silica or silica-based material or a glass or glass-based material.

* * * * *